United States Patent [19]

Kalfon

[11] Patent Number: 4,768,222
[45] Date of Patent: Aug. 30, 1988

[54] CONTROL AND SURVEILLANCE SYSTEM FOR PREPAYMENT PUBLIC TELEPHONE APPARATUS

[76] Inventor: René Kalfon, 816 rue de la Haie, 76230 Bois Guillaume, France

[21] Appl. No.: 893,291
[22] PCT Filed: Nov. 22, 1985
[86] PCT No.: PCT/FR85/00331
§ 371 Date: Jul. 21, 1986
§ 102(e) Date: Jul. 21, 1986

[30] Foreign Application Priority Data

Nov. 22, 1984 [FR] France ................. 84 17807

[51] Int. Cl.$^4$ ........................................... H04M 1/57
[52] U.S. Cl. .................................... 379/91; 379/144; 379/146
[58] Field of Search ................ 379/91, 144, 33, 123, 379/132, 152, 146, 150; 235/380, 381

[56] References Cited

U.S. PATENT DOCUMENTS

| | | | |
|---|---|---|---|
| 4,122,308 | 10/1978 | Weinberger et al. | 179/7.1 |
| 4,123,623 | 10/1978 | McElliott | 379/33 |
| 4,206,321 | 6/1986 | McElliott | 379/33 |
| 4,208,549 | 6/1980 | Polillo et al. | 379/146 |
| 4,263,482 | 4/1981 | Serres et al. | 179/6.3 R |
| 4,296,277 | 10/1981 | Daneffel | 179/1 |
| 4,384,175 | 5/1983 | Brown | 179/175.2 |
| 4,417,101 | 11/1983 | Serres et al. | 179/8 R |
| 4,439,636 | 3/1984 | Newkirk et al. | 379/144 |

FOREIGN PATENT DOCUMENTS 2903479 8/1980 Fed. Rep. of Germany ........ 379/91

OTHER PUBLICATIONS

A. Turbat "Telepayment and Electronic Money-The Smart Card", *Commutation & Transmission*, No. 5, 12/82, pp. 11-20.
*Teleconnect* article, "The payphone People"—Mar., 1986, 132-134.

*Primary Examiner*—Robert Lev
*Attorney, Agent, or Firm*—Lowe, Price, LeBlanc, Becker & Shur

[57] ABSTRACT

In an apparatus, a passive equipment is designed to transmit informations on a telephone line, indicating energization of the apparatus, hook-off condition, insertion of a prepaid credit, collection of part of the credit, or operating anomalies. An active equipment is located to be inaccessible to the public and close to the central office, and performs establishment, holding and management of telephone communications seized by the apparatus, in order to perform a permanent check on the conformity of various phases of a communication and to ensure dependance of continued communication upon information transmitted by the apparatus. On the telephone line, the information is transmitted within a frequency band differing from the communication frequency (voice) band so as not to affect the communication signals.

32 Claims, 15 Drawing Sheets

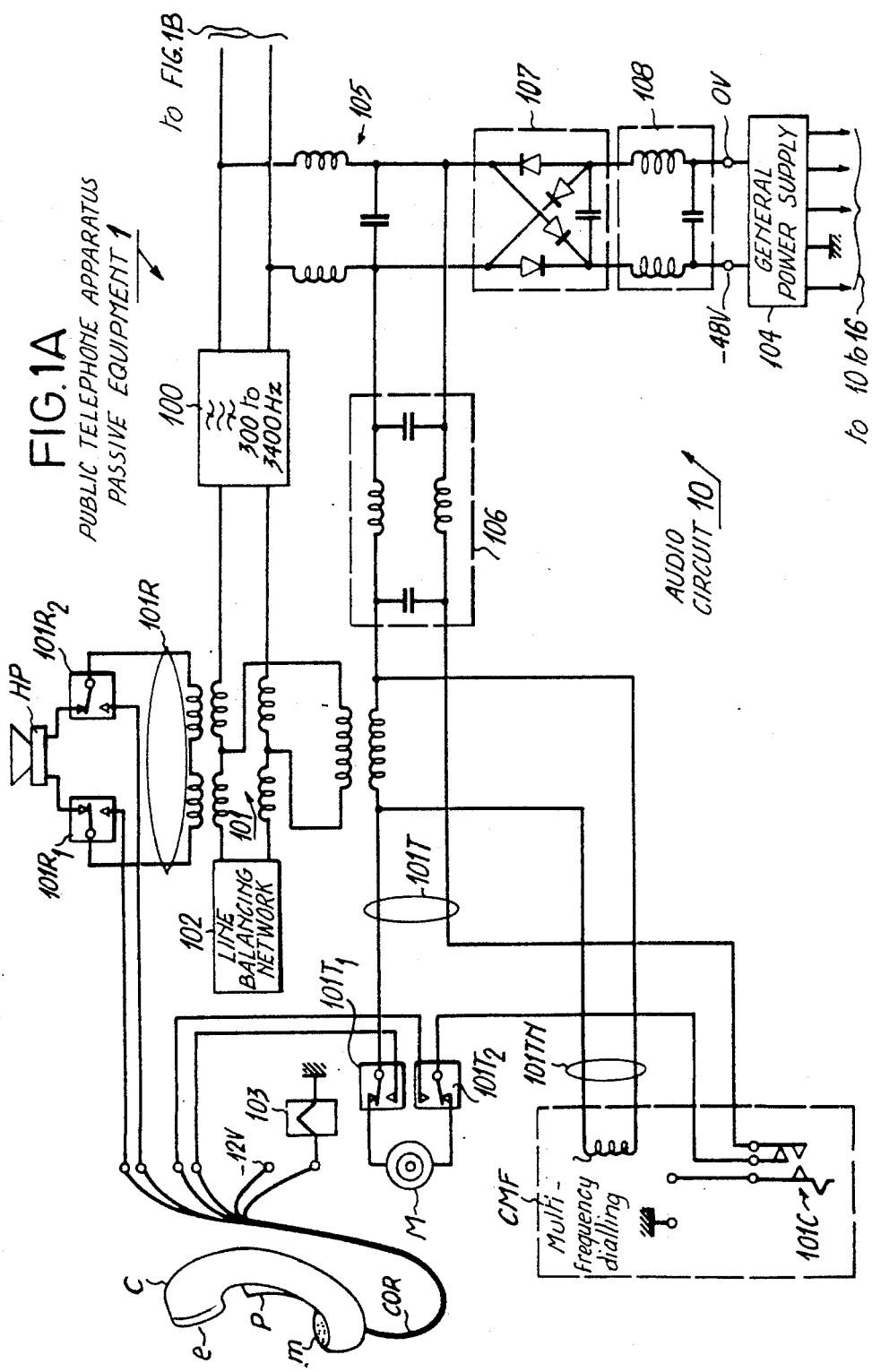

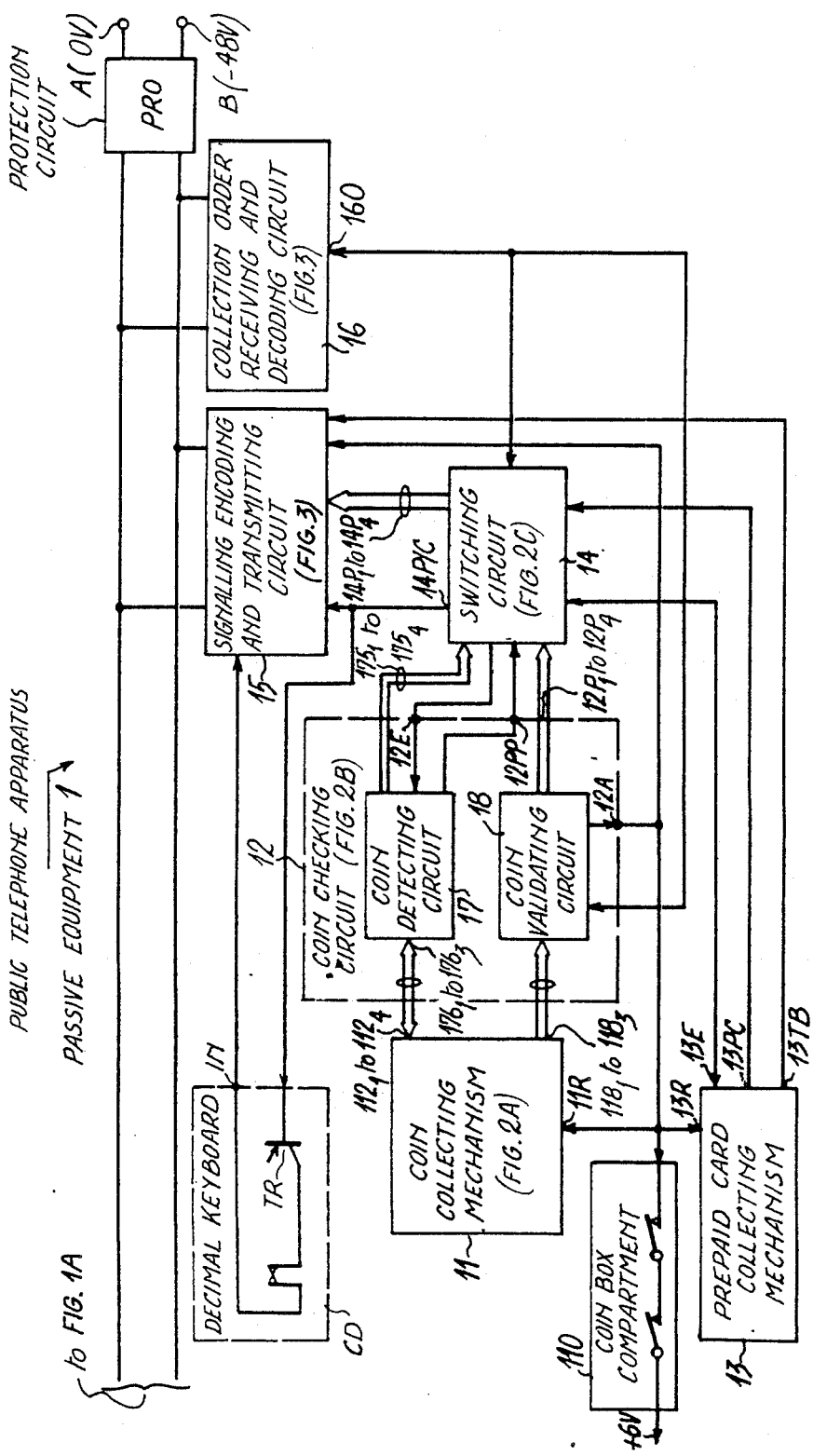

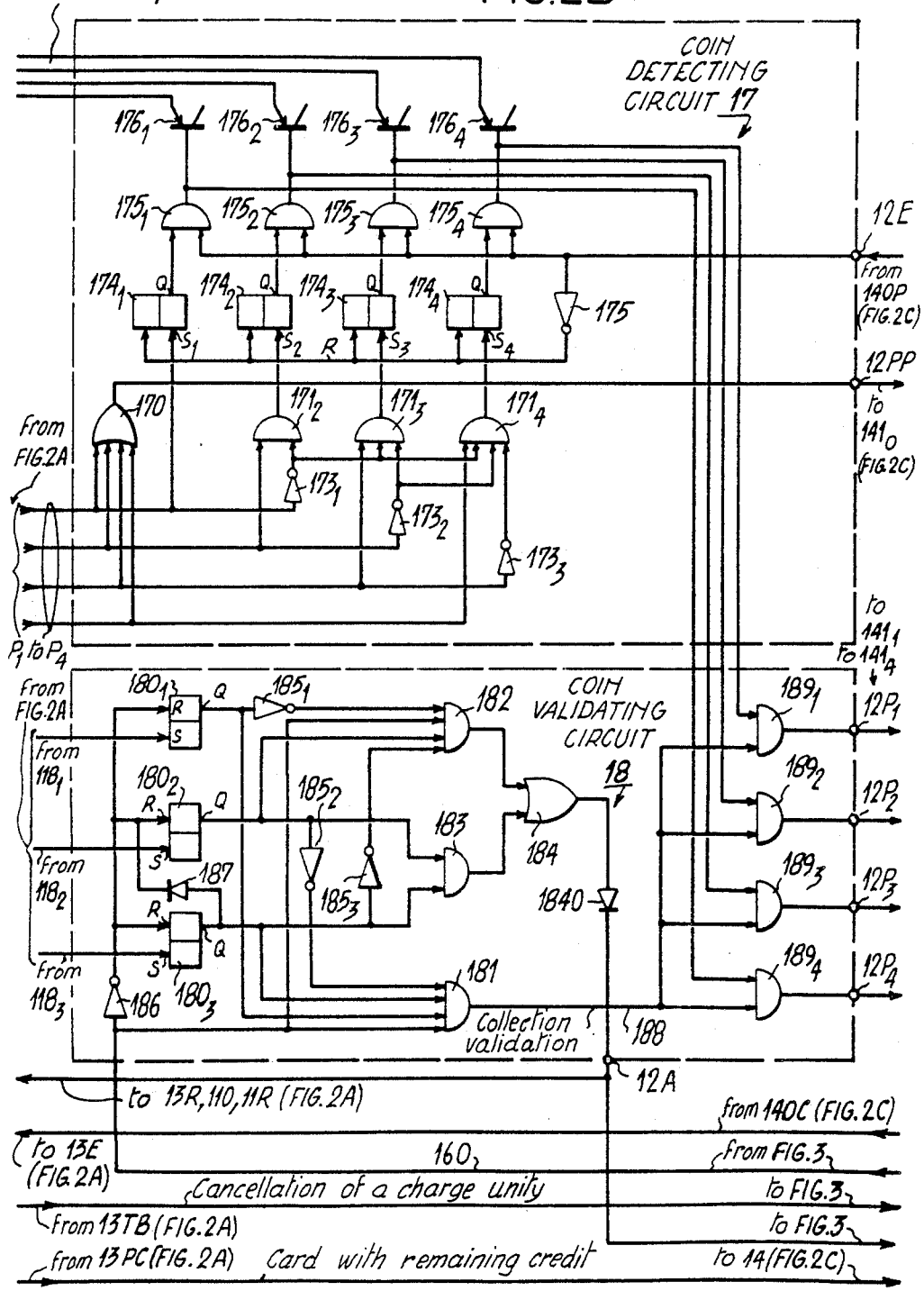

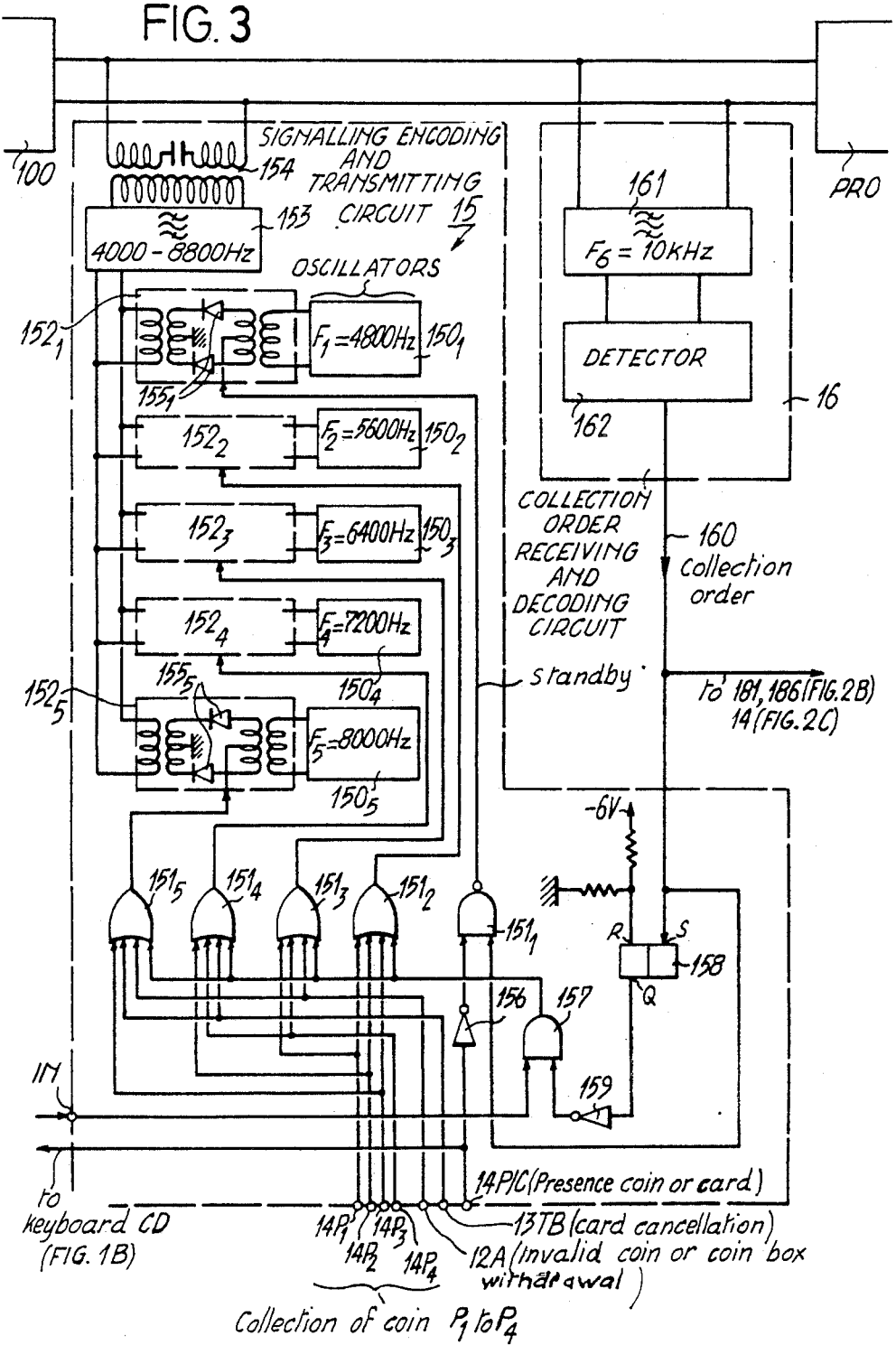

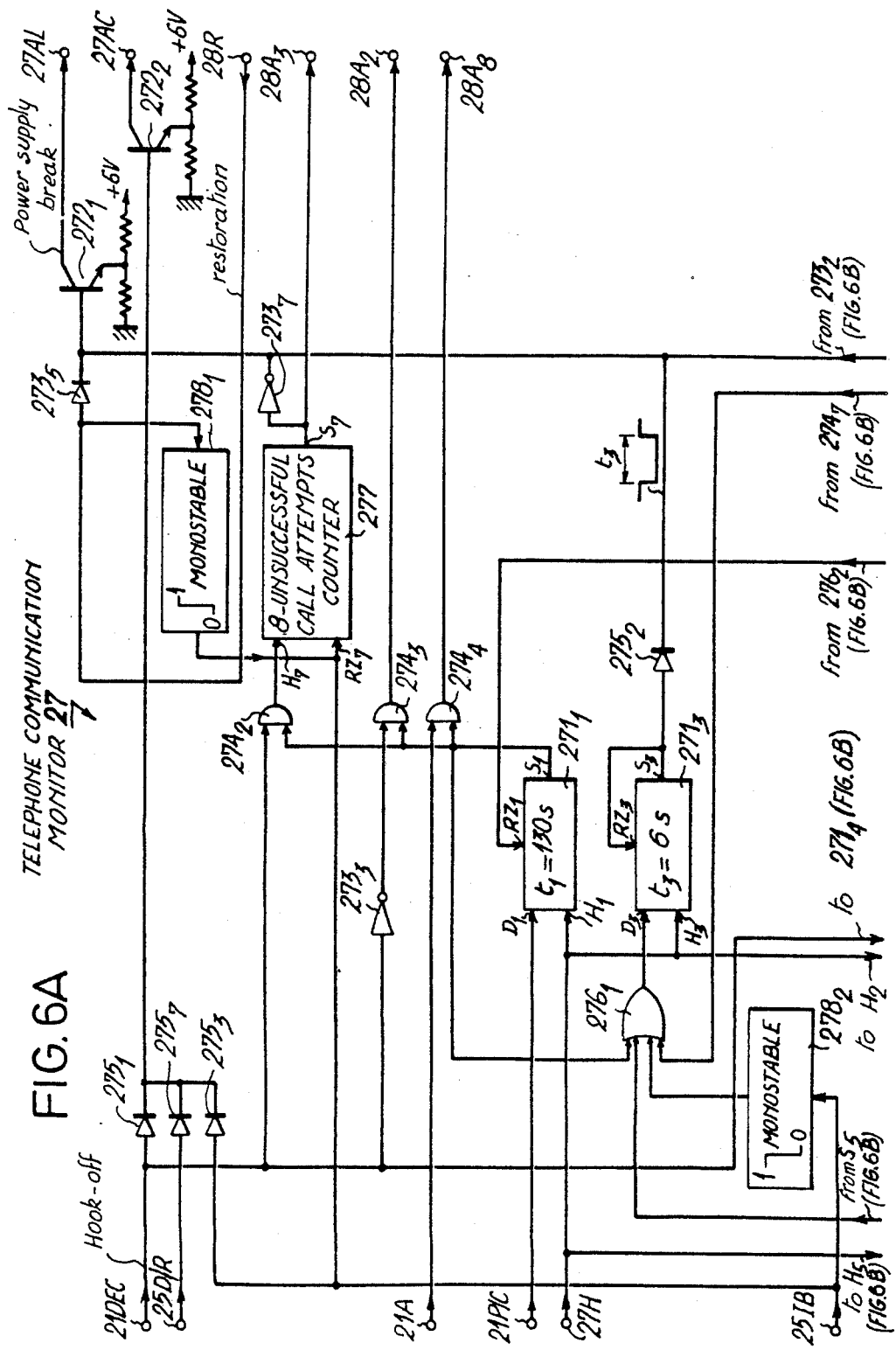

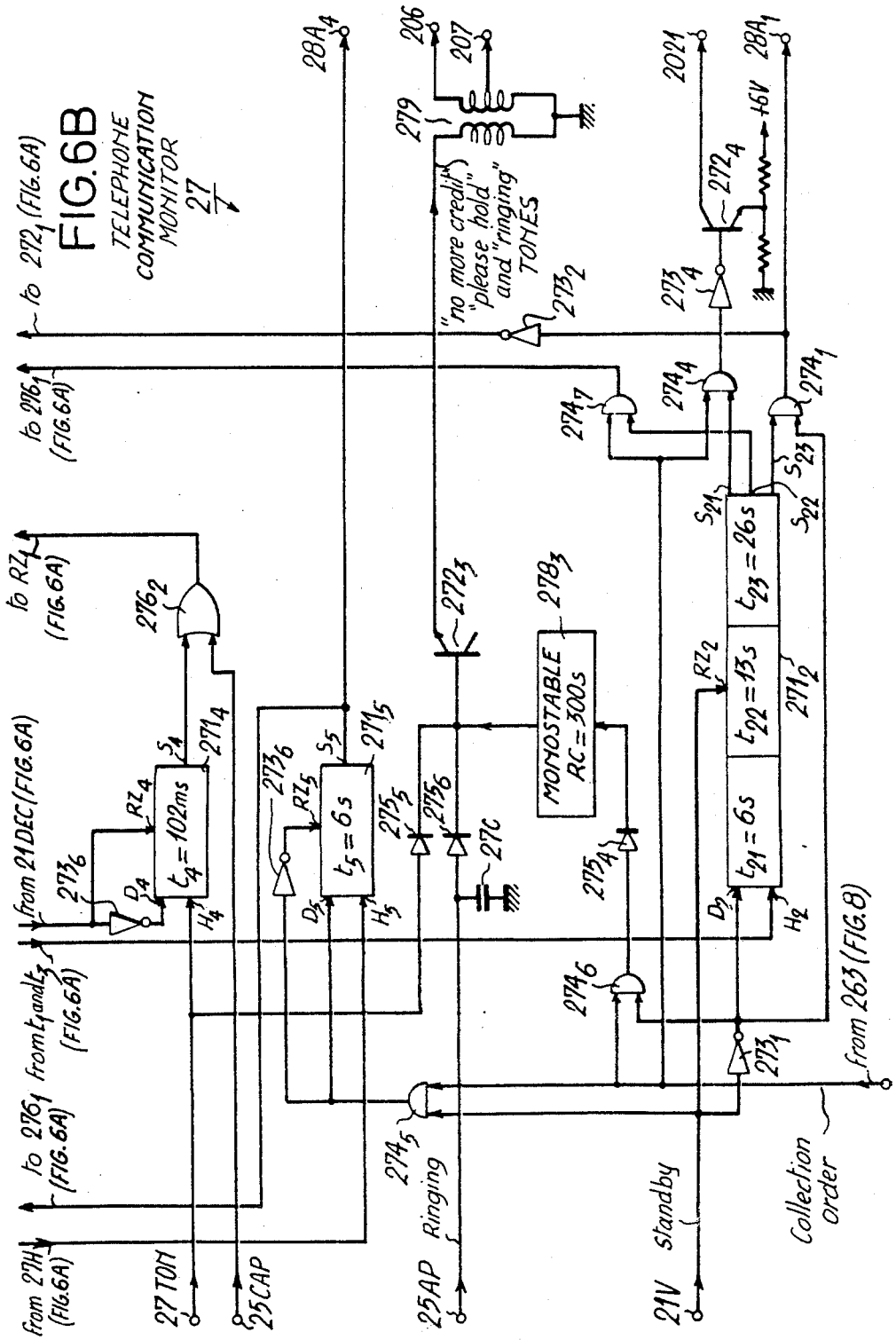

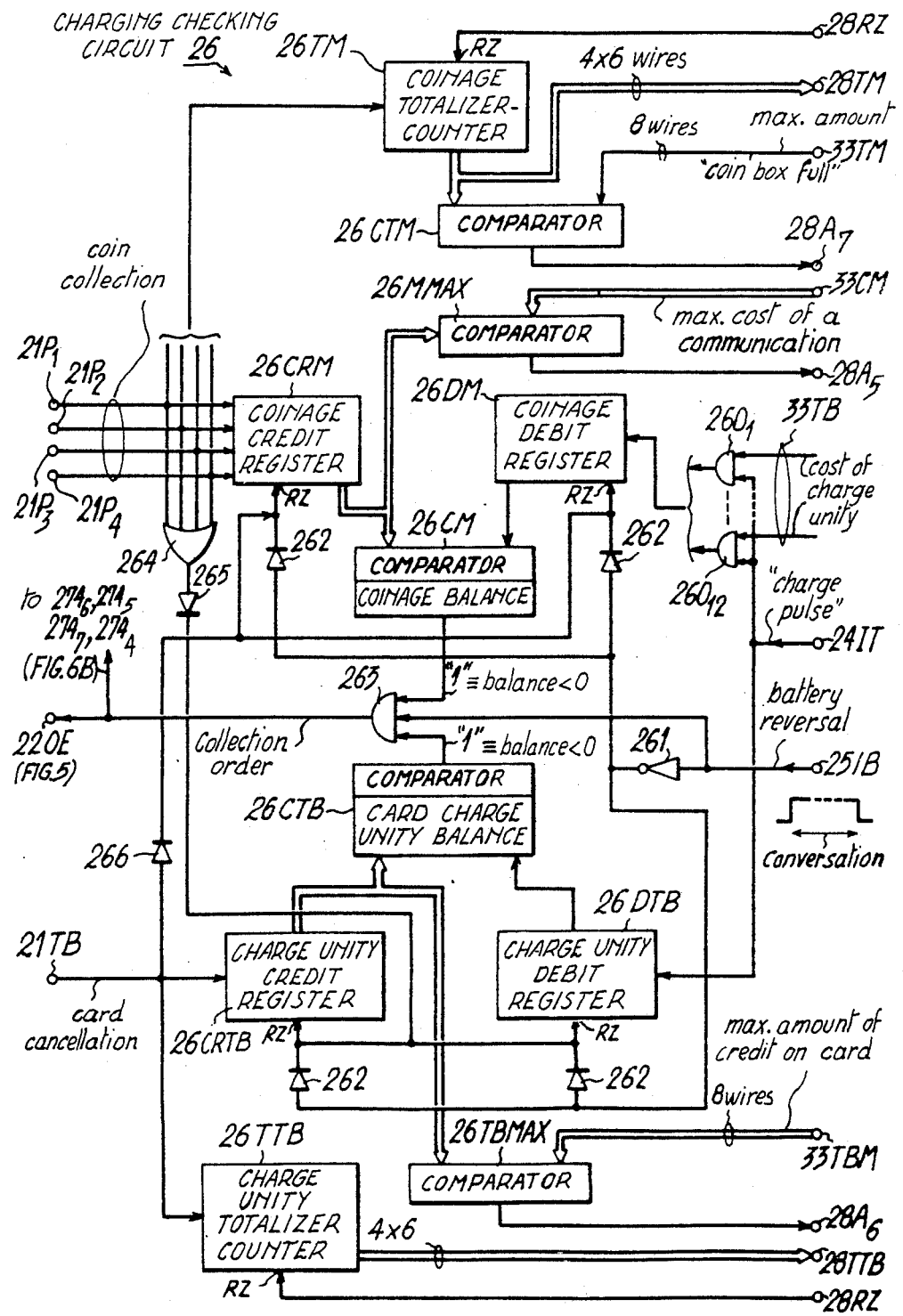

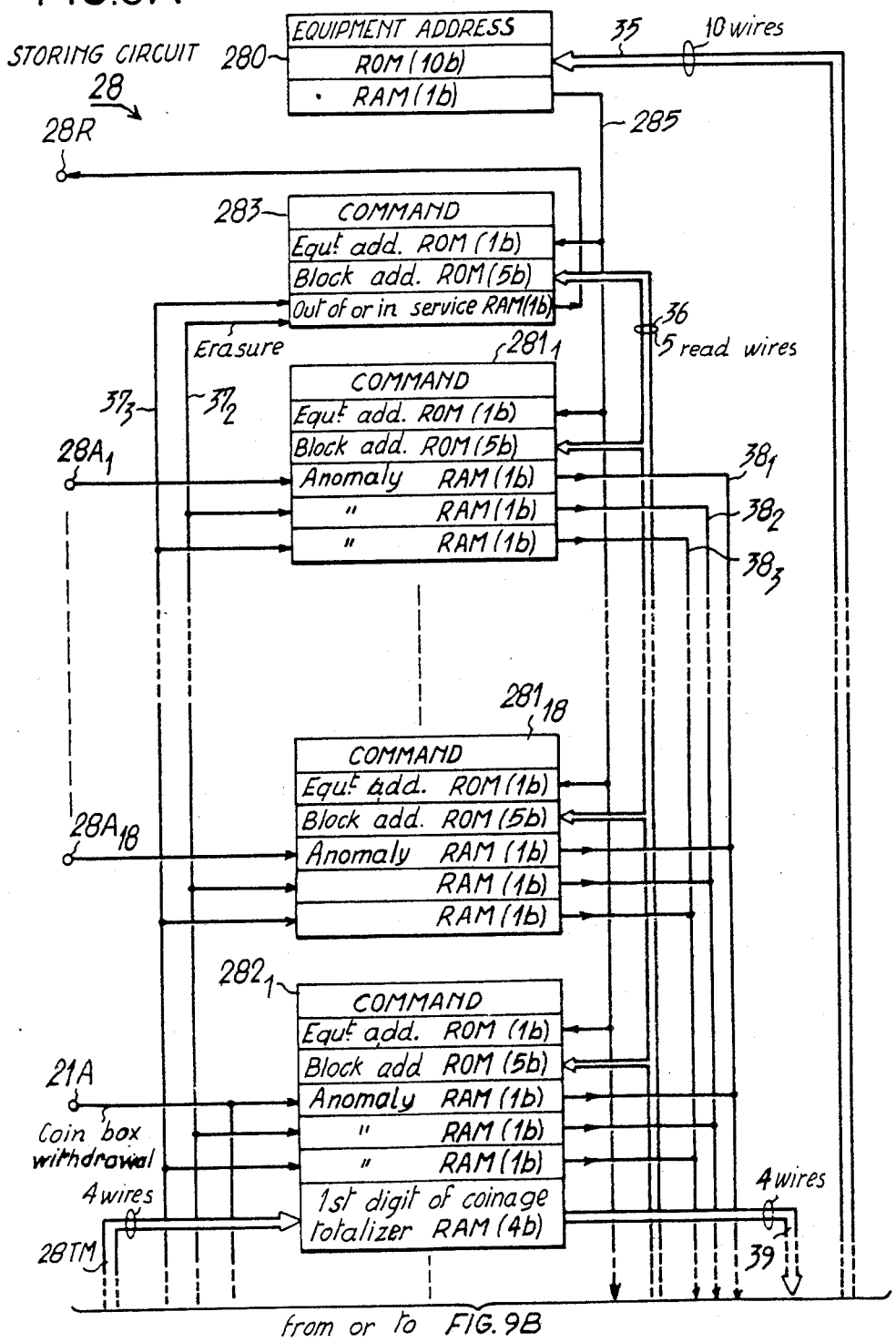

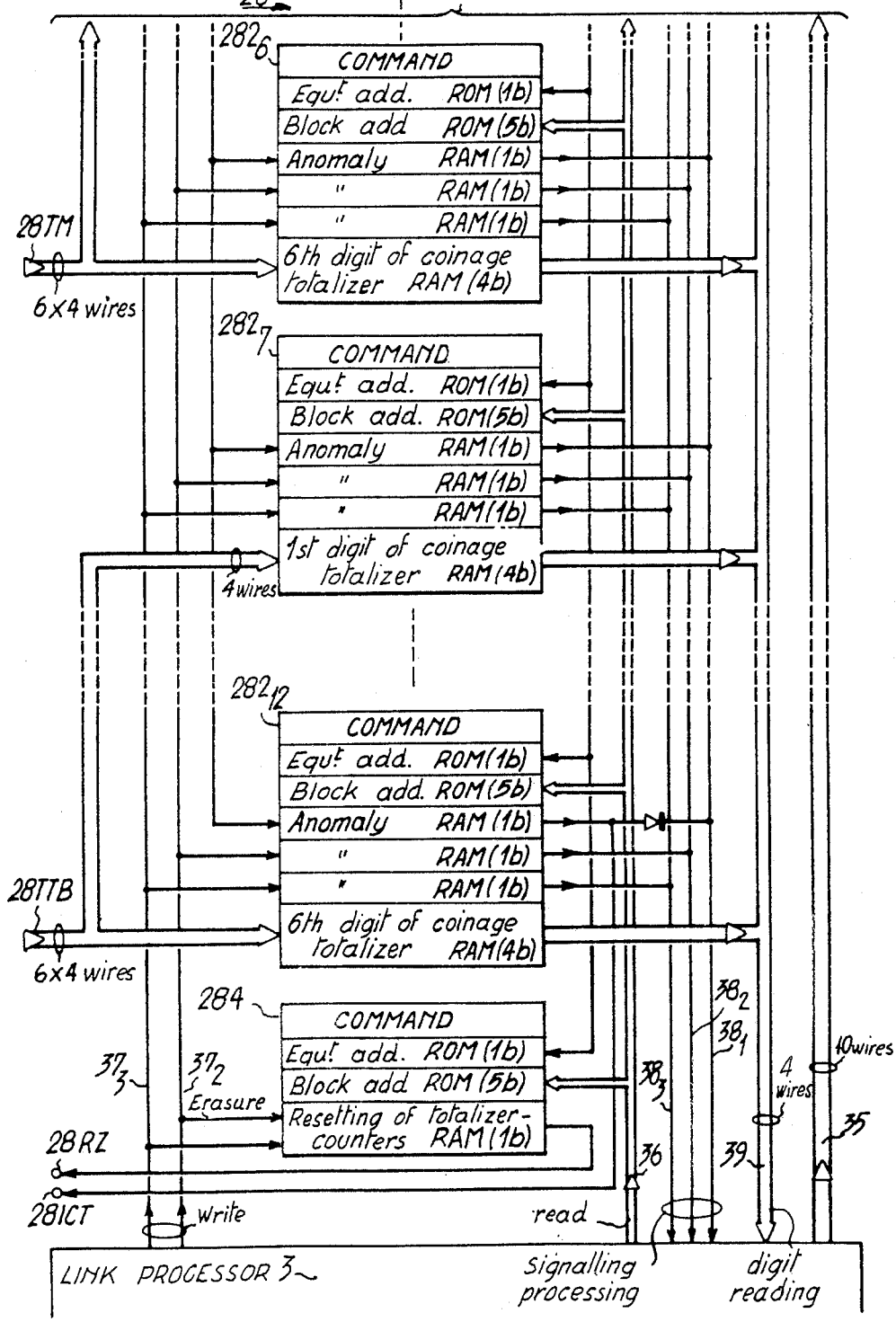

CONTROL AND SURVEILLANCE SYSTEM FOR PREPAYMENT PUBLIC TELEPHONE APPARATUS

CROSS REFERENCES TO RELATED APPLICATIONS

Applicant hereby makes cross references to his Patent Application PCT/FR 85/00 331, filed Nov. 22, 1985 and claims priority thereunder following the provisions of 35 U.S.C. 119.

BACKGROUND OF THE INVENTION

1. Field of the Invention

The present invention relates to a control and surveillance system for a prepayment public telephone connected to a telephone central office via a telephone line. A communication may be prepaid by means of coins or a credit card.

2. Description of the Prior Art

The problems involved in the management of public telephones in the face of increasing acts of vandalism and fraud lead to a series of observations calling into question current strategy and highlighting the weak points of known systems. The system embodying the invention is designed taking account of the following observations.

In order to combat fraud were developed increasingly complex public telephones, becoming more and more expensive and required increasingly delicate and costly maintenance. To each type of fraud there is a particular type of defense which, on the one hand, increases the complexity and the cost of the apparatus and, on the other, leads the defrauders to resort to increasingly powerful and damaging means. At present, the losses due to vandalism and fraud are considerable. As an exaple, about 20% of telephone traffic carried by public telephones is fraudulent. Repairs due to vandalism and the loss of revenue due to frauds have reached several hundred million Francs for a total of more than one hundred thousand apparatuses.

Remote surveillance of these apparatuses might be based on the analysis of the number of basic charge unities elapsed during a predetermined period for each public telephone, as described in European patent EP-B-0,004,497. In this case, remote surveillance only notes the anomalies after the event and does not allow immediate action. In other cases, such as the use of signalling contacts, remote surveillance is limited since it is dependent on the normal intervention by the personnel; it can therefore only be used outside service hours, thus reducing its effectiveness.

From the point of view of management and daily operation, the systems currently in service offer the following disadvantages:

Operating anomalies, faults and unusual or fraudulent acts by the user are neither detected, nor identified, nor even signalled.

The collection of revenue by coin box collection staff poses a considerable verification problem, inadequately dealt with by the existing procedure which is inefficient and cumbersome owing to the fact that the coin boxes are sealed. Memory coin boxes, such as described in European patent application EP-A-0,041,457, provide a solution to this problem, but at the price of a complex, inflexible and costly operating procedure.

Accounting and technical operating data concerning the apparatuses are currently analyzed by means of hightly dispersed ressources making collection and utilization of these data difficult and laborious. The collection and analysis of the various operating indicators are so complex that in practice, the control services use this ressource sparingly.

OBJECTS OF THE INVENTION

The main object of the present invention is to provide a control and surveillance system for at least one prepayment public telephone apparatus, remedying the disadvantages mentioned earlier, concerning particularly fraud and vandalism. In particular, the invention aims to distance as far as possible from the reach of the public, means involved in the establishment, holding and management of telephone communications seized by the public telephone and to check permanently, and in a location inaccessible to the public, the conformity of various phases of a telephone communication, with the continuation of the communication being dependent on informations transmitted by the public telephone apparatus.

SUMMARY OF THE INVENTION

Accordingly, a control and surveillance system for a prepayment public telephone connected to a telephone central office via a telephone line, is characterized in that it comprises a first equipment included in said apparatus and connected to the telephone line for transmitting signals indicating particularly energization of the apparatus, a hook-off, an insertion of a prepaid credit (coin or card) into the apparatus, a collection of a part of said prepaid credit, and apparatus operating anomalies, and a second equipment interconnected across the telephone line between said apparatus and said central office and detecting said signals transmitted by the first equipment and signals transmitted by the central office to check particularly the operation of the apparatus and to establish, break and interrupt phases of a telephone communication.

The second active equipment is preferably installed close to the telephone central office, and analyzes and manages the outgoing and incoming telephone communications. Such an equipment location improves security, reliability and management of the public telephone apparatus.

According to a feature of the invention, the telephone line between the first and second equipments is energized with dc voltage from the second equipment so that the latter can check the power supply to the first equipment. This check is performed by monitoring a standby signal which is transmitted permanently by the first equipment.

According to the invention, the first and second equipments are interactive through signals exchanged only between the equipments, which provides constant, detailed monitoring of each phase of a communication. A self-surveillance thus provided by a looped, interactive signalling makes the system more fraud-resistant, and technically the operation of the system is more reliable in the face of incidents of all types. Furthermore, all incidents are signalled and identified immediately. This procedure does away with all preventive maintenance.

In addition, the means for establishing, holding, breaking or interrupting a communication included in the second equipment are thus out of reach of the public, which to a large extent guarantees correct operation of the system. Thus, the second equipment is protected from vandalism and the first equipment, installed on the public highway, is kept to the strict minimum.

According to features of the invention, the system allows mixed prepayment: coins and prepaid card. The management of a communication in the second equipment is fully independent of coin and card collecting mechanisms included in the apparatus. Adaptation to the mechanisms takes place at the level of a switching interface in the first equipment. During one same communication, the payment mode, coin or card, may at any moment be changed by the user. Thus a communication may be continued with coins when the card runs out of credits. In addition, mixed prepayment reduces the coin collection workload. For the user, a prepaid card is easier to use than loose change, which also limits the user's telephone consumption according to the number of coins in his possession.

An actual collection of coins is checked in the first equipment by detecting coins in at least three points along the coin chute into a coin box. A logic circuit in the first equipment detects any anomaly in the coin flow direction, due to fraud with a "piece of string" or fraudulent access to a collection chute subjacent to the coin box for example. In this case, an anomaly is recorded in less than one second in the second equipment, as with coin box break-in, followed by remote controlled switching off.

According to other features, the second equipment monitors the opening of a compartment containing the coin box and/or removal of the coin box. Each opening of the coin box compartment automatically implies a registration of an amount of coins contained in the coin box and a number of charge unities cancelled from prepaid cards during communications. These informations are instantly transmitted by the second equipment to a remote management means, such as a management computer, in the same way as other operating anomaly signallings.

The second equipment restores the apparatus to the state awaiting communication or an out-of-service mode, as applicable, following an incorrect utilization by the user or an operating fault in the first equipment such as absence of transmission of certain signals or an absence of signals transmitted by the central office.

According to another features, the apparatus may be called by any other public or private telephone apparatus. In this case, a special call tone is transmitted by the second equipment to the calling part to inform him that he is calling a public telephone.

Generally speaking, the system embodying the invention is also distinguished by its capacity for integrated computerized management. This management covers the technical aspects such as signalling, location of faults, preventive maintenance and self-checking of all phases of a communication, automatic switching over to out-of-service mode and automatic or manual return to in-service state as chosen by the manager, as well as the financial aspects such as coin collection, collected amounts, absence of traffic, average revenue, etc.

BRIEF DESCRIPTION OF THE DRAWING

The foregoing and other features and advantages of the invention will be apparent from the following description of several preferred embodiments of the invention with reference to the corresponding accompanying drawings in which:

FIGS. 1A and 1B are schematic block diagrams of a first equipment included in a public telephone apparatus, an audio circuit of the apparatus being detailed in FIG. 1A;

FIGS. 2A, 2B and 2C show in detail a coin checking circuit associated with a coin collecting mechanism, as well as a switching circuit working in conjunction with the coin collecting mechanism and a prepaid card collecting mechanism in the telephone apparatus;

FIG. 3 shows in detail a signalling encoding and transmission circuit and a collection order receiving and decoding circuit order forming an interface between the first equipment and a telephone line serving the apparatus;

FIGS. 6A and 6B show in detail a telephone communication monitor included in the second equipment;

FIG. 8 shows in detail a charging checking circuit included in the second equipment; and FIGS. 9A and 9B show an anomaly and coinage totalizer amount and cancelled charge unity storing circuit included in the second equipment.

DESCRIPTION OF THE PREFERRED EMBODIMENTS

Figure 2A:
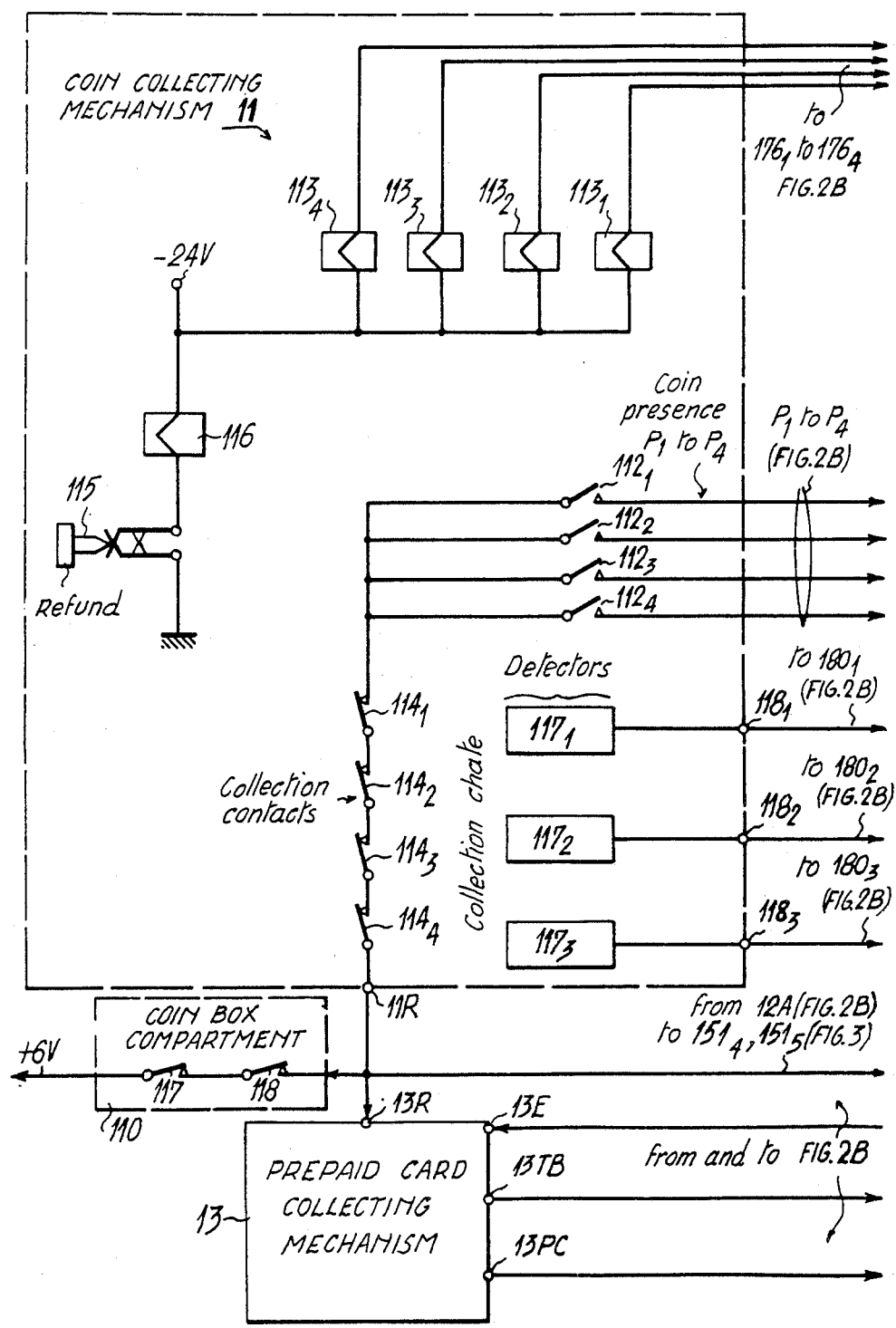

As shown in FIGS. 1A, 1B, 4A and 4B, a control and surveillance system essentially comprises a first equipment 1 included in a prepayment public telephone apparatus and a second equipment 2 located close to a local central office and interconnected in a two-wire telephone line $AB-A_2B_2$ connecting the apparatus to the central office. Indeed, as will be seen later, the telephone line $A_0B_0-A_2B_2$ is a true telephone line between the second equipment and the central office conventionally carrying voice signals and other known signals normally exchanged between a telephone set and a local central office. However, the telephone line between the telephone apparatus and the second equipment is a two wire line $AB-A_1B_1$ energized with dc voltage by the second equipment, remote powering the first equipment, and only carrying the voice signals and the signals exchanged between the two equipments. In particular, the line between the apparatus and the second equipment does not transmit charge pulses delivered from the central office and is not subject to a reply and hook on by a called party, such as first and second reversals of the central office battery voltage. The second equipment only allows bi-directional transmission of signals within a telephone frequency band, between the first equipment and the central office.

The first equipment 1 is hereinafter referred to as "passive equipment" because its various functions are mainly dependent upon a check made in the second equipment. Consequently, the second equipment 2 is referred to as "active equipment" since it establishes, monitors, checks and manages the various phases of a telephone communication at the request of the first equipment.

The passive equipment 1 is firstly described with reference to FIGS. 1 to 3, anticipating the description of certain functions of active equipment 2 for the purposes of clarity. The active equipment 2 is then described with reference to FIGS. 4 to 9.

PASSIVE EQUIPMENT

With reference to FIGS. 1A and 1B, the passive equipment 1 comprises an audio circuit 10 for transmitting and receiving telephone signals and powering other circuits of the passive equipment, a dialling keyboard such as a keyboard CD coupled to a decimal code signalling device, or a keyboard CMF coupled to a multifrequency code signalling device, according to the capabilities of the central office, a coin collecting mechanism 11 associated with a closed compartment of coin box 110, a coin checking circuit 12 for detecting and validating coins to be collected, a prepaid card collecting mechanism 13, a switching circuit 14 for selecting the means of payment, coin or card, chosen by the user, a signalling encoding and transmitting circuit 15 and a collection order receiving and decoding circuit 16.

The passive equipment 1 is connected to terminals A and B of the two-wire telephone line via a protection circuit PRO. The PRO circuit protects the logic circuits included in equipment 1 against all overvoltages occuring on the line.

The audio circuit 10 shown in FIG. 1A comprises a telephone handset C equipped with a trigger P and a "hands-free" used audio block comprising a microphone M and a loudspeaker HP. The handset C is connected to a telephone column containing the rest of passive equipment 1 by means of a conductor cord COR, while the microphone M and the loudspeaker HP are flush with a wall of the column.

Voice signals are transmitted from a microphone m of the handset C or from microphone M, and voice signals are received into an earpiece e of the handset or into loudspeaker HP via a differential transformer 101. Differential transformer 101 is interconnected to the telephone line through a band-pass filter 100 having a telephone frequency pass band of 300 to 3400 Hz and through the protection device PRO, and to a line balancing network 102 terminating the line. The differential transformer 101 provides protection against acoustic feedback, so called Larsen effect, by splitting the bidirectional telephone line into a reception channel 101R and a transmission channel 101T. The reception channel 101R is connected to the loudspeaker HP and the earpiece e via movable contacts of two switches $101R_1$ and $101R_2$. The transmission channel 101T is connected to microphone M and m via movable contacts of two other switches $101T_1$ and $101T_2$. In addition to four conductive wires connecting earpiece e and the microphone into stationary contacts of two pairs of switches $101R_1$, $101R_2$ and $101T_1$, $101T_2$ respectively, the cord COR contains two conductive wires to power a relay 103 when trigger P is pressed. Activation of relay 103 modifies the state of switches $101R_1$, $101R_2$, $101T_1$ and $101T_2$ which disconnect the loudspeaker HP and the microphone M from transformer 101 in order to connect the earpiece e and the microphone m of the handset C to the telephone line. When trigger P is released, the loudspeaker HP and the microphone M are connected to the telephone line. Loudspeaker HP may thus receive a call tone when the telephone apparatus is called by a remote subscriber.

The passive equipment 1 also comprises a dialling keyboard having keys which are accessible through a perforated wall of the telephone column. The keys cannot be torn off or pressed in excessively. When the local central office is capable of receiving audiofrequency dialling signals, the dialling keyboard is the multifrequency keyboard CMF transmitting a combination of two voice frequencies from among seven for each digit, via a second transmission channel 101TN of the differential transformer 101. The keyboard CMF also comprises contacts 101C interconnected in the first transmission channel 101T to disconnect microphones M and m from the telephone line and power a multifrequency generator in the keyboard CMF after insertion of a coin in the mechanism 11, or a card with credits remaining, in the mechanism 13, for transmission of multifrequency dialling signals without disturbance of the microphone signals when the CMF keyboard keys are pressed. When the local central office is able to receive rotary pulse dialling signals, the keyboard is the keyboard CD coupled to a decimal signalling device transmitting pulse streams equal in number to the dialled digits. As will be seen hereinafter, the pulses modulate a set of signalling frequencies.

As shown in FIG. 1A, the audio circuit 10 also comprises means for taking the electric power needed by the circuits contained in the passive equipment 1, using the dc voltage of 48 volts in the telephone line AB. As will be seen subsequently, the passive equipment power supply voltage is not subject to reversal of the exchange battery voltage. Terminals A and B are at 0 and −48 volts respectively, corresponding to the central battery voltage. However, in other embodiments, the passive equipment may be remote supplied by the active equipment at a voltage of 96 volts or other suitable voltage. The taking means essentially comprises a general power supply 104 suitably regulated and protected in order to supply dc voltages of 0 V, ±6 V, −12 V and −24 V particularly. The power supply 104 is connected to the telephone line between filter 100 and protection circuit PRO, via a power supply bridge 105 protected by an assembly of choke coils and capacitors 106, a full-wave rectifier 107 and a filter 108. These latter circuits protect the power supply 104 against accidental permutation of wires A and B of the line and therefore against a reversal of the polarities of these wires.

The coin collecting mechanism 11 and the prepaid card collecting mechanism 13 do not fall within the subject of the invention and will not be described in detail.

The coin collecting mechanism 11 is capable of accepting various kinds of coins. Hereinafter, it will be assumed that N=4 different types of coins, $P_1$ to $P_4$, can be accepted for collection; for example, the values of the coins are $P_1=1$ FF, $P_2=2$ FF, $P_3=5$ FF and $P_4=10$ FF (French franc). The mechanism 11 particularly comprises four slides respectively in which coins $P_1$ to $P_4$ slide downward between coin insertion slots and storage areas, and a switching device beneath the storage areas to direct each coin to the coin box contained in compartment 110, via a collection chute or to a refund dish via a refund chute.

As shown in FIG. 2A, contacts $112_1$ to $112_4$ are controlled respectively by detectors included in the storage areas. Each contact $112_1$ to $112_4$ is closed provided at least one coin is present in the corresponding slide. When a collection order transmitted by the active equipment 2 is received by the passive equipment 1 and indicates that the balance of a communication is negative, as will be seen hereinafter, one of four time relays $113_1$ to $113_4$ opens one of collection contacts $114_1$ to $114_4$ to send the corresponding detected coin into the collection chute through the switching device. However, the switching device empties the content of all the storage slides into the refund chute when a pushbutton 115 is pressed in, and cuts off the power supply of the passive equipment via a relay 116 in order to simulate hook-on by the calling user; the user then recuperates the coins which were stored pending collection. Releasing of relay 116 is also produced when there is a short cut in power supply 104 for time $t_3 = 6$ s, in particular at the end of a communication under the control of the active equipment when the called party has hung up or when the balance of the communication in progress is negative for a predetermined period of $t_{22} = 13$ s, as will be seen hereinafter.

When a coin is being collected, it passes successively through three coin descent detectors $117_1$ to $117_3$ located at three different levels and each delivering a pulse to a respective output $118_1$ to $118_3$ of mechanism 11 after the coin has passed. These detectors help to validate the collection of each coin to be collected in order to notify the collection of said coin to the active equipment. However, as will be seen hereinafter, the passage of a coin to be collected along a route different from normal descent between the switching device and the coin box is signalled to the active equipment by means of an anomaly signal.

The detection and validation of coins to be collected are now described in detail with reference to the operation of the coin checking circuit 12. Circuit 12 comprises a coin detecting circuit 17 and a coin validating circuit 18 shown in FIG. 2B.

The coin detecting circuit 17 comprises an OR gate 170 having four inputs connected to the coin presence contacts $112_1$ to $112_4$ respectively. An output 12PP of the OR gate is at logic state "1" as soon as a coin $P_1$ to $P_4$ is present in one of the storage slides, which is indicated by the closed state of at least one of contacts $112_1$ to $112_4$. Terminal 12PP at state "1" signals hook-off by the calling user.

Three AND gates $171_2$, $171_3$ and $171_4$ allow collection of the coins in an order of priority, starting with the coins having the lowest value $P_1$. This reduces the loss incurred by the user in the event of a dialling error or a very short communication. Gates $171_2$, $171_3$ and $171_4$ have two, three and four inputs respectively. Contact $112_1$ is connected to first inputs of the three gates $171_2$ to $171_4$ through an inverter $173_1$. Contact $112_2$ is connected directly to a second input of gate $171_2$, and via an inverter $173_2$ to second inputs of gates $171_3$ and $171_4$. Contact $112_3$ is connected directly and via an inverter $173_3$ to third inputs of gates $171_3$ and $171_4$ respectively. Contact $112_4$ is directly connected to a fourth input of gate $171_4$. Inputs $S_1$ to $S_4$ of flip-flops $174_1$ to $174_4$ are connected to contact $112_1$ and outputs of AND gates $171_2$ to $171_4$ respectively. Thus input $S_n$, n varying from 1 to $N=4$, is at state "1" and the other inputs $S_1$ to $S_{n-1}$ and $S_{n+1}$ to $S_N$ are at "0" provided that one coin $P_n$ is present in the corresponding slide and that no coins of values less than $P_1$ to $P_{n-1}$ are present in the corresponding slides. As soon as a coin collection order is detected by receiving circuit 16 and provided a card is not inserted in mechanism 13, an output 160 of circuit 16 passes to state "1" and applies a "0" to inputs R of flips-flops $174_1$ to $174_4$ via an AND gate 140P in the switching circuit 14 (FIG. 2C) and an inverter 175. Only flip-flop $174_n$ corresponding to a coin with the lowest value among those coins present has an output Q at "1".

Figure 2C:
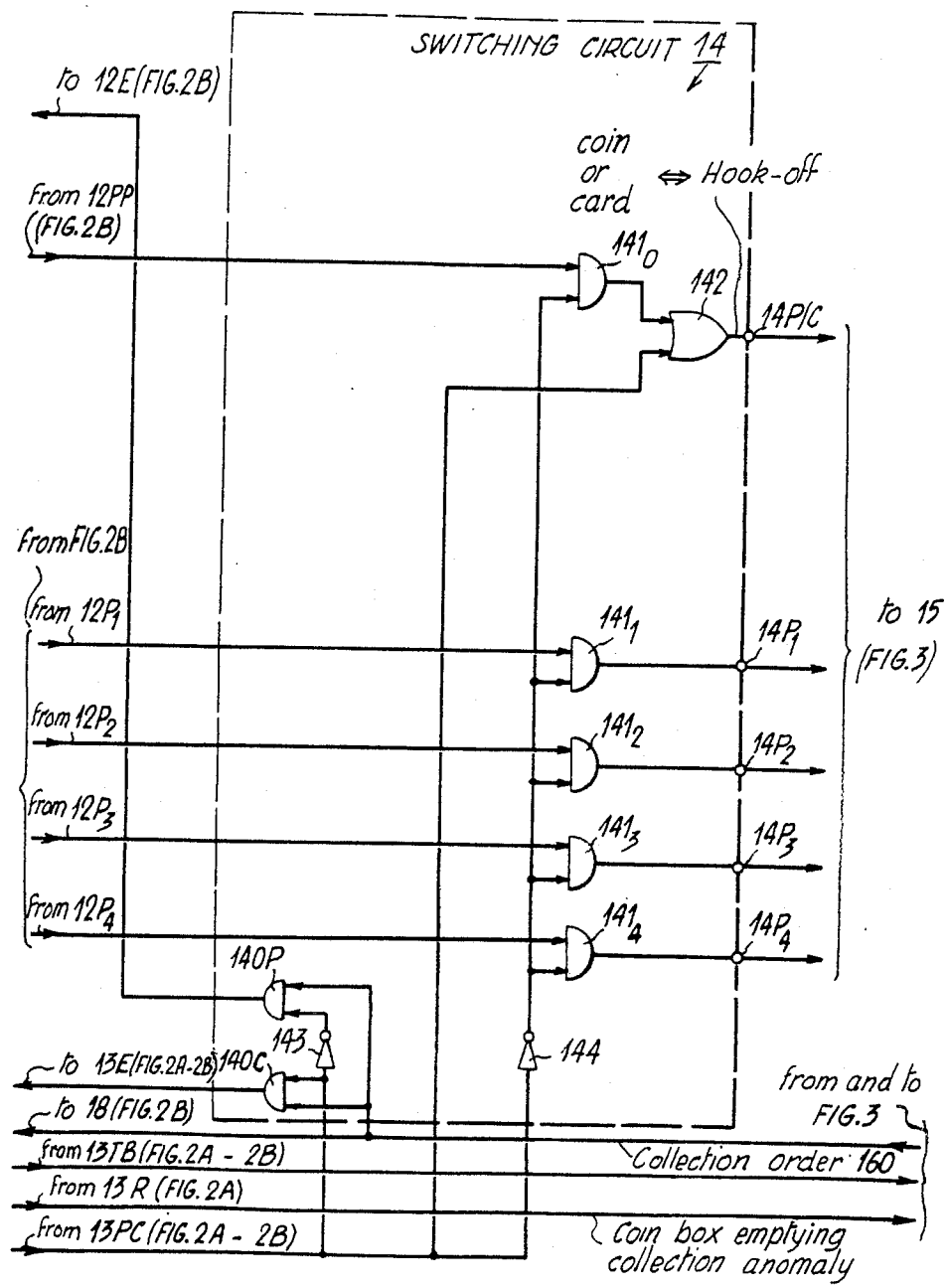

The outputs Q of flips-flops $174_1$ to $174_4$ are respectively connected to first inputs of AND gates $175_1$ to $175_4$ having second inputs connected to the output 12E of gate 140P. Relays $113_1$ to $113_4$ are connected to outputs of gates $175_1$ to $175_4$ via transistors $176_1$ to $176_4$ respectively. When the input $S_n$ of flip-flop $174_n$ is at "1", gate $175_n$ is opened by the collection order signal and transistor $176_n$ is turned on to activate relay $113_n$ (FIG. 2A). The activated relay $113_n$ opens the corresponding contact $114_n$ in order to neutralize coin detection during validation of collection of coin $P_n$, and to signal the presence of coin $P_n$ by a "coin presence" pulse. As shown in FIG. 2C, this pulse is delivered by output 12PP to an output 14P/C of the switching circuit 14 via an AND gate $141_0$ and an OR gate 142 in the switching circuit 14. Activated relay 113 also controls the switching device so that the coin $P_n$ falls into the collection chute.

Normal descent of the coin $P_n$ from top to bottom and its coming through the three stacked detectors $117_1$, $117_2$ and $117_3$ in turn in the collection chute is signalled by the coin validating circuit 18. Circuit 18 shown in FIG. 2B comprises three RS flip-flops $180_1$ to $180_3$, two four-input AND gates 181 and 182, one two-input AND gate 183, one two-input OR gate 184 and inverters $185_1$ to $185_3$, 186 and 187. Inputs R of flip-flops $180_1$ to $180_3$ are connected to output 160 of the receiving circuit via inverter 186. A collection order resets to "0" outputs Q of flips-flops $180_1$ to $180_3$ before collection proper of the coin $P_n$ to be collected. Inputs S of flips-flops $180_1$ to $180_3$ are connected to outputs $118_1$ to $118_3$ of mechanism 11 respectively and are at "1" in response to coin $P_n$ passing before detectors $117_1$ to $117_3$. Given that the output Q of flip-flop $180_3$ is connected to the input S of flip-flop $180_2$ via inverser 187, the outputs Q of flips-flops $180_1$ to $180_3$ are at "1", "0" and "1" respectively when the coin $P_n$ passes through detectors $117_1$ to $117_3$. The inputs of validation gate 181 are connected directly to the collection order terminal 160 and to the outputs Q of flips-flops $180_1$ and $180_3$, and via inverter $185_2$, to the output Q of flip-flop $180_2$ respectively; an output 188 of gate 181 then passes to "1". This state validates collection of the coin by opening AND gates $189_1$ to $189_4$ having other inputs connected to the outputs of gates $175_1$ to $175_4$ respectively. In the switching circuit 14 shown in FIG. 2C, AND gates $141_1$ to $141_4$ have first inputs connected to outputs $12P_1$ to $12P_4$ of gates $189_1$ to $189_4$ respectively. Second control inputs of gates $141_0$ to $141_4$ are at "1" and open these gates provided no card is present in mechanism 13. Then, among outputs 14P/C and $14P_1$ to $14P_4$ of gates 142 and $141_1$ to $141_4$, only gate $14P_n$ is at "1" to indicate actual collection of coin $P_n$. The output 14P/C is at "0" if the coin just collected was the last in the storage areas, or to "1" if one or more coins are still waiting in the storage areas.

However, any abnormal combination of states of outputs Q of flips-flops $180_1$ to $180_3$ other than "1", "0" and "1" keeps gates 181 and $189_1$ to $189_4$ closed, and this abnormal combination is signalled by means of gates 182, 183 and 184, with "1" on output 12A of circuit 12 connected to the output of OR gate 184 via a diode 1840. In fact, the inputs of the AND gate 182 are connected directly to the output Q of flip-flop $180_2$ and terminal 160 and, via inverters $185_1$ and $185_3$, to the outputs Q of flips-flops $180_1$ and $180_3$ respectively; the inputs of the AND gate 183 are connected to the outputs Q of flips-flops $180_1$ and $180_3$ respectively; and the outputs of gates 182 and 183 are connected to the inputs of the OR gate 184 respectively. A "1" state at output 12A signals an anomaly, for example resulting from extraction of a coin from the coin box in an upwards direction through detectors $117_3$, $117_2$ and $117_1$, or stoppage of the coin $P_n$ to be collected before it reaches detector $117_3$ or at the level of detector $117_3$, preceding an interruption of the collection order signal, or following it, that is, whatever the state of terminal 160.

The prepaid card collection mechanism 13 shown in FIG. 2A also has two outputs 13PC and 13TB and one input 13E acting similarly to output 12PP, outputs $12P_1$ to $12P_4$ and input 12E of the coin collection checking circuit 12, respectively. Output 13PC is at "1" when a card is present in the mechanism 13 and has a positive charge unity credits remaining. In all other cases, such as absence of card, incorrect card, card exhausted, or closure of card insertion slot in the mechanism 13, output 13PC is at "0". In the switching circuit 14 shown in FIG. 2C, the output 13PC is connected to control inputs of gates 140C and 140P directly and via an inverter 143, to a second input of OR gate 142 and, via an inverser 144, to the control inputs of AND gates $141_0$ to $141_4$. AND gates 140P and 140C have second inputs connected to terminal 160 and have outputs connected to terminals 12E and 13E respectively. Thus, if there is no card, gates 140P and $141_0$ to $141_4$ are opened and the mechanism 11 can be used for collection of coins and therefore enable the communication to be paid for with coins. However, if a card with remaining credits is present, only mechanism 13 can be used to pay for the telephone communication, mechanism 13 receiving the order to collect through open gate 140C. A state "1" at the output 14P/C of OR gate 142 indicates that either there is at least one coin present in the storage slides of mechanism 11, or that there is a card present in mechanism 13. Withdrawal or insertion of the card by the user, or the utilization of all the credits on the card, does not interrupt the communication, and the switching circuit 14 automatically substitutes mechanism 11 for mechanism 13, and vice-versa. As regards the active equipment, the communication remains established and it must remain so whichever of mechanisms 11 or 13 is in operation. In particular, the user with no credits left on his card may continue the communication in progress without interruption, by inserting coins. The switching over between mechanisms 11 and 13 may be made at any moment without disturbing in the slightest either the communication or the charging.

The same pushbutton 115 is used simultaneously in the coin and card collecting mechanisms to cease a communication and trigger refund of coins in storage, and/or an ejection of the card.

The operating sequences between the active and passive equipments are therefore similar during utilization of a card or of coins. Only the interpretation of the collection order at terminal 160 differs in mechanisms 11 and 13. In the card collection mechanism 13, a collection order received at input 13E triggers a cancellation of a telephone charge unity on the card. This cancellation is signalled by a state "1" at output 13TB, until the collection order signal is interrupted by the active equipment when a charge unity credit register in the active equipment is credited with the value of the cancelled charge unity and thus triggers a positive balance for the communication in progress, as will be seen with reference to FIG. 8.

In order to avoid a distortion in the evaluation of the amount of the coins contained in the coin box at the moment of its withdrawal, the debited sums from cards are totalized in a charge unity totalizer-counter distinct from a coinage totalizer-counter totalizing the values of the collected coins. In addition, state "1" at output 13TB indicates to the active equipment that the card payment mode is used.

The different signals delivered from outputs 14P/C, $14P_1$ to $14P_4$, $12_A$ and 13TB are encoded and transmitted by the encoding and transmitting circuit 15 shown in FIG. 3. Encoding consists in modulating combinations of two frequencies selected from among five predetermined carrier frequencies $F_1$ to $F_5$, by the pulses delivered from the abovementioned outputs respectively. Circuit 15 comprises five oscillators $150_1$ to $150_5$ producing the five carrier frequencies $F_1$ to $F_5$ respectively, as well as a gate circuit selecting the combinations of the two frequencies. Frequencies $F_1$ to $F_5$ have values higher than the telephone frequency band of 300 to 3400 Hz and are, for example, $F_1=4800$ Hz, $F_2=5600$ Hz, $F_3=6400$ Hz, $F_4=7200$ Hz and $F_5=8000$ Hz.

Outputs of a two-input NAND gate $151_1$ and of four four-input OR gates $151_2$ to $151_5$ are respectively connected to the mid-points of first secondary windings of double transformers included in symmetrical modulators $152_1$ to $152_5$. First primary windings of the double transformers are connected to the outputs of oscillators $150_1$ to $150_5$. Second secondary windings forming outputs of modulators $151_2$ to $151_5$ are connected in parallel to inputs of a bandpass filter 153 having a passband of 4000 to 8800 Hz, filter 153 being connected to terminals A and B of the telephone line via a transformer 154 and protection circuit PRO. In each modulator $152_1$ to $152_5$, there are two forward-biased diodes $155_1$ to $155_5$ between the first secondary winding and a second primary winding of the associated double transformer. The transmissions of frequencies $F_1$ to $F_5$ from oscillators $150_1$ to $150_5$, which operate permanently when power-supplied, are controlled by state "1" at the outputs of gates $151_1$ to $151_5$ respectively, and the diode pairs $155_1$ to $155_5$ are turned on respectively.

Frequency $F_1$ is not transmitted on the line when a collection order, reflected by state "1" at output 160 of the receiving circuit 16, is applied to a first input of NAND gate $151_1$ and when an absence of coins from the storage slides and an absence of card with credits remaining are signalled by state "0" at terminal 14P/C which is connected to a second input of gate $141_1$ through an inverser 156. The output of NAND gate $151_1$ is thus at state "0" and blocks diodes $155_1$. Thus, after establishing a telephone communication, that is after hook-off, dialling, battery reversal reversing the polarity of the line wires on the local central office side, and detection of the first charge pulse by the active equipment, frequency $F_1$, called as the standby frequency, is interrupted as soon as there are no more coins in the slides of mechanism 11 and no card with credits remaining in mechanism 13, and as soon as a collection order is transmitted by the active equipment responsive to a negative balance for the communication in progress. However, the standby frequency $F_1$ is transmitted if at least one coin is present in the storage slides at the moment the collection order is received. After this collection, transmission of frequency $F_1$ is maintained, despite the absence of coins in storage, until reception of the following collection order and provided that no coins have been inserted in the meantime.

Outputs $14P_1$ to $14P_4$ of the switching circuit 14 are connected to inputs of gates $151_2$ and $151_3$, inputs of gates $151_2$ and $151_4$, inputs of gates $151_2$ and $151_5$ and inputs of gates $151_3$ and $151_4$ respectively. Subsequently, effective collections of coins $P_1$, $P_2$, $P_3$ and $P_4$ are signalled by combinations of carrier frequencies $F_2+F_3$, $F_2+F_4$, $F_2+F_5$, and $F_3+F_4$ respectively. Collection of a charge unity when a card is present, that is cancellation or debiting of one charge unity on the card, results in application of a "1" to inputs of gates $151_4$ and $151_5$ from output 13TB of mechanism 13, and therefore by transmission of frequencies $F_4+F_5$.

In addition, two other frequency combinations may be transmitted by circuit 15.

When the dialling phase uses a decimal keyboard, keyboard CD is activated in response to hook-off simulated by the presence of a coin in the storage slides or of a card in mechanism 13, reflected by a "1" at the 14P/C output of the switching circuit. Dialling pulses are delivered from an output IN of the keyboard CD to fourth inputs of OR gates $151_2$ to $152_5$ via a two-input AND gate 157. As shown in FIG. 1B, output IN reproduces the CD decimal keyboard dialling pulses provided that a transistor TR in the keyboard is turned on by a state "1" at terminal 14P/C reflecting the presence of coins and/or card. The other input of AND gate 157 is connected to an output Q of a RS flip-flop 158 via inverter 159. An input S of flip-flop 158 is connected to terminal 160 of the receiving circuit, and an input R of flip-flop 158 is at state "0" by application of a biasing voltage of −6 volts. During the communication establishing phase until the first battery reversal, terminal 160 is at "0", which keeps gate 157 open. Each dialling pulse thus modulates a combination of carrier frequencies $F_2+F_3+F_4+F_5$. Then, as soon as a collection order is received by circuit 16, flip-flop 158 memorizes the "1" state and, via inverter 159, closes gate 157, which inhibits all transmission of dialling pulses from the terminal IN of the keyboard CD. At the end of a telephone communication reflected by a brief interruption of the 48 V voltage on the line by the active equipement, the input R of flip-flop 158 passes to "1", which again opens gate 157.

When a coin is not validated at collection, output 12A of validation circuit 18 applies an "1" to inputs of gates $151_3$ and $151_5$, and a combination of frequencies $F_3+F_5$ is transmitted to signal an anomaly.

The combination of frequencies $F_3+F_5$ is also used to signal opening of the coin box compartment 110 and removal of the coin box from compartment 110. As shown in FIGS. 2 and 3, these two operations respectively open two contacts 117 and 118 series-connected between a terminal at +6 V and the common input 12A of OR gate $151_3$ and $151_5$. As shown in more detail in FIG. 2A, terminal 12A is connected to terminal 11R of mechanism 11 to which contacts $114_4$ to $114_1$ are series-connected, and to terminal 13R of mechanism 13. Opening of one of contacts 117 and 118 thus cuts the 6 V power supply to mechanisms 11 and 13 and, consequently, terminals 14P/C, $14P_1$ to $14P_4$ and 13TB are kept at zero, which makes it impossible to establish a telephone communication.

As will be seen later on, the active equipment 2 sums the values of the coins collected in the coin box as and when the communications take place, which means that the total amount collected since the last time the coin box was emptied is known. This precise indication of the total amount of the collections to date given by the active equipment, which manages the credit for each communication, also allows a check to be made on the revenue collected by totalizing the values of the coins collected independently of the reading of the telephone meters associated with the public telephone apparatus. Given that the amount contained in the coin box is known at the precise instant of coin box withdrawal, indicated by the opening of contacts 117 and 118, the design of the coin box is simple and it is no longer necessary to resort to inefficient and time-consuming sealing. The opening of contacts 117 and 118 triggering transmission of frequencies $F_3+F_5$ to the active equipment triggers, in the active equipment, memorization of the extremely accurate total amount of the coins included in the coin box and the number of charge unities provided from prepaid cards since the previous withdrawal of the coin box. This memorization allows effective checking of the funds collected by the collection staff. During the period the coin box is being withdrawn, no telephone communication can be established or held, since the active equipment simulates that the line is busy on the local central office side. If, at the beginning of transmission of frequencies $F_3+F_5$, corresponding to the opening of compartment 110, the latter contains a coin box and is then closed within a predetermined time of $t_1=130$ s, the coin box withdrawal is considered to be normal. However, in all other cases, when the coin box is absent and/or when the compartment is opened after time $t_1$, the active equipment 2 places the public telephone in out-of-service mode by cutting the −48 V power supply to terminals AB of passive equipment 1. Outside, the coin box withdrawing periods preset by a management computer, as will be seen later on, no time delay of $t_1=130$ s takes place. In normal operation, opening of the coin box compartment 110 by force is signalled by transmission of frequencies $F_3+F_5$ to the active equipment which generates an alarm. Thus the presence and absence of the 130 s time delay allows a differentiation to be made between the transmissions of the $F_3+F_5$ frequencies signalling incidents occuring after normal withdrawing of the coin box and signalling break-in during normal operation.

As shown in FIG. 3, the receiving and decoding circuit 16 comprises a bandpass filter 161 and a frequency detector 162. Filter 161 offers a narrow frequency-band centered on a carrier frequency $F_6=10000$ Hz modulated by collection order pulses. Inputs of filter 161 are connected to the AB line terminals, between the protection circuit PRO and the filter 100. This filter delivers $F_6$ frequency modulating pulses to detector 162 delivering each collection order in the form of a pulse on output 160. The duration of this pulse varies, but is generally equal to a maximum of $t_{21}=6$ s.

As soon as the voice signal communication is established after the first battery reversal, the active equipment transmits through the line a first collection order at frequency $F_6$ setting output 160 of the receiving and decoding circuit 16 to "1". For this first collection order, a time delay $t_5=6$ s is designated to remedy to an incident concerning collection of coin or cancellation of charge unity on a card to avoid a blockage condition, as will be seen later on.

If, after a time not exceeding $t_{21}$, the active equipment receives any one of the four combinations of frequencies $F_2+F_3$, $F_2+F_4$, $F_2+F_5$ and $F_3+F_4$ signalling that a coin is being collected normally, which is confirmed by the absence of transmission of frequencies $F_3+F_5$, and therefore that the coin collecting mechanism 11 is used, the active equipment 2 stops transmission of frequency $F_6$ and enters into a coinage credit register for the communication, the value of the coin corresponding to the one of the five frequency combinations transmitted. Similarly, if after a time not exceeding $t_{21}$, the active equipment receives the combination $F_4+F_5$, signalling cancellation of one charge unity on a card and therefore use of prepaid card collecting mechanism 13, the active equipment stops transmission of frequency $F_6$ and enters the value of the charge unity for the communication into a charge unity credit register. In both cases, the active equipment permanently compares the memorized credit with the status of the debit of the communication in progress, shown by the cost of charge unities or the number of charge unities respectively. Whenever the credit-debit balance becomes negative, the active equipment delivers a collection order corresponding to frequency $F_6$. A new coin is collected, or a charge unity is cancelled from the card, and the credit-debit balance becomes positive.

However, if during the time $t_{21}=6$ s following transmission of each collection order at frequency $F_6$ after the first order, none of the five combinations of frequencies $F_2+F_3$, $F_2+F_4$, $F_2+F_5$, $F_3+F_4$ and $F_4+F_5$ is received by the active equipment, which is also signalled by interruption of the standby frequency $F_1$ indicating an absence of coins in the storage slides, or an absence of card, or no credits remaining on card present, the active equipment transmits to the audio circuit 10 a "no more credit" tone at 1250 Hz, which is superimposed on the voice signals. This tone informs thus the user that he should feed at least one coin into the mechanism 11 or insert a card with positive credit into mechanism 13. Pending the credit input, the active equipment suspends the telephone communication between the public telephone and the local central office and holds the 1250 Hz tone for a period of 7 seconds following the $t_{21}=6$ s time delay. However, the telephone link is kept between the local central office and the remote user who receives a tone, preferably also at 1250 Hz, asking him to "please hold". After a time of $t_{22}=13$ s succeeding the start of the tone transmissions during which the balance remains negative, the communication is finally broken by the active equipment by means of a brief cut off of the power supply of the passive equipment.

ACTIVE EQUIPMENT

The active equipment 2 analyzes, monitors and manages the various phases of a telephone communication. In particular, the active equipment performs detailed financial management of each communication, sums the collection totals, making a distinction between a cash or coinage account and a prepaid-card charge-unity account, both for each communication and globally for all communications since the last withdrawing of the coin box contained inside the public telephone apparatus. Data collected by the active equipment are processed by a remote management computer OG which prints out the accounts situation and the quality of the operation of the passive equipment. In practice, several active equipments associated respectively with public telephone apparatuses served by a common local central office are grouped together in an extensible frame able to contain up to 1024 active equipments. As shown in FIG. 4B, all active equipments use a common link processor 3 connected to the management computer OG via a modem 30 and a switched telephone line 31. The modem 30 operates in half-duplex, with a modulation rate generally of 200 bauds. The processor 3 is connected to the modem through a signalling channel multiplexer-demultiplexer 32 and is also connected to a central memory 33, such as a wired memory or a REPROM. The memory 33 contains parameters subject to change, such as the value of the charge unity, a maximum cost of telephone communication beyond which the cost is considered to be abnormally high, a maximum number of charge unities which can be debited from a prepaid card, a maximum amount corresponding to a full coin box, and a telephone number of the management computer OG.

Figure 4A:
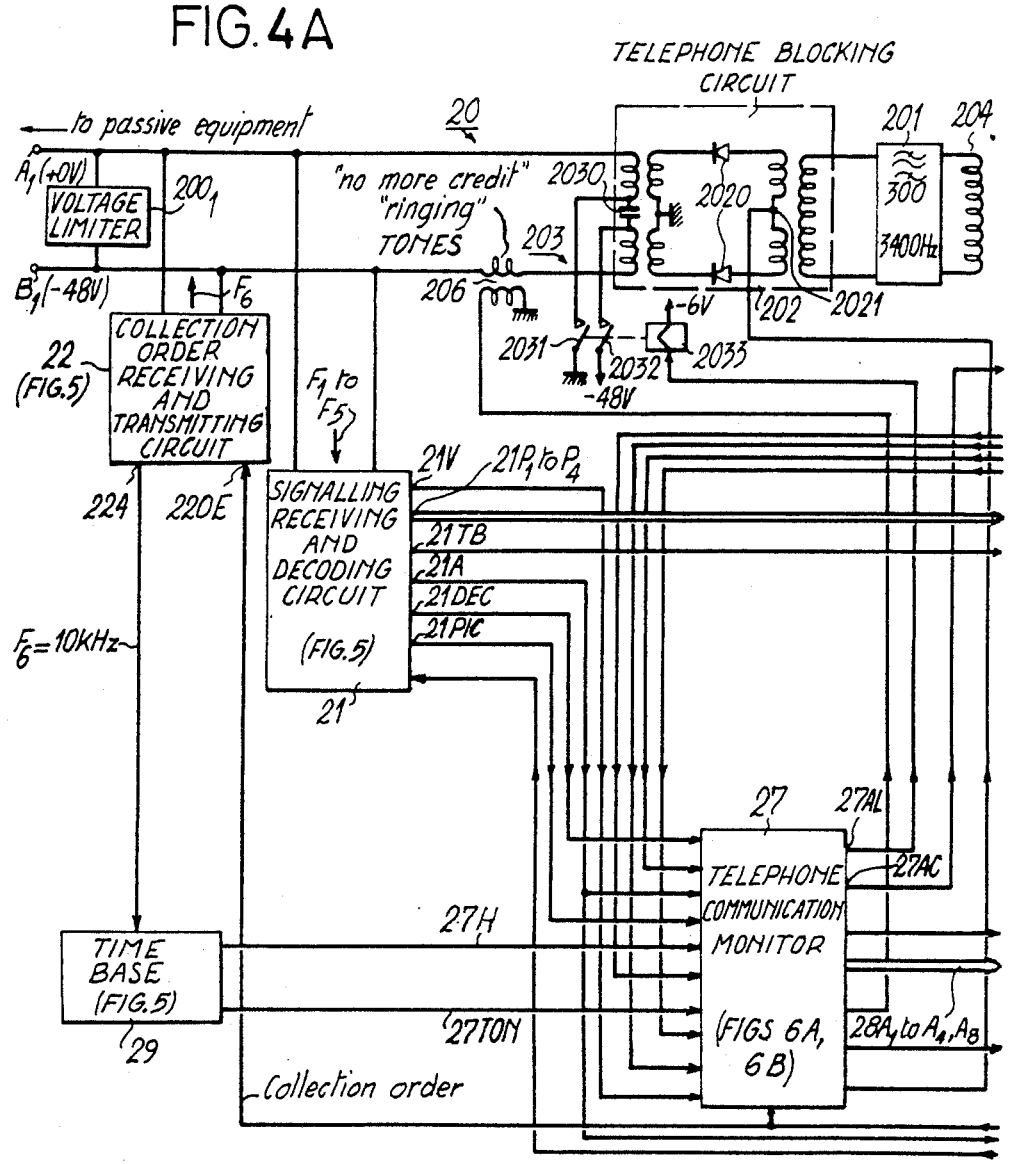
FIGS. 4A and 4B are a block-diagram of a second equipment located close to a local central office for monitoring and controlling the first equipment, means for interconnecting various circuits in the second equipment to the telephone line being shown in detail, and means for managing several second equipment items being shown schematically.
Figure 4:
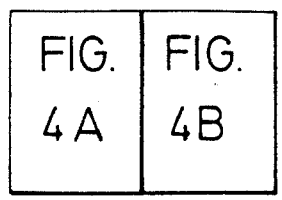
Figure 4B:
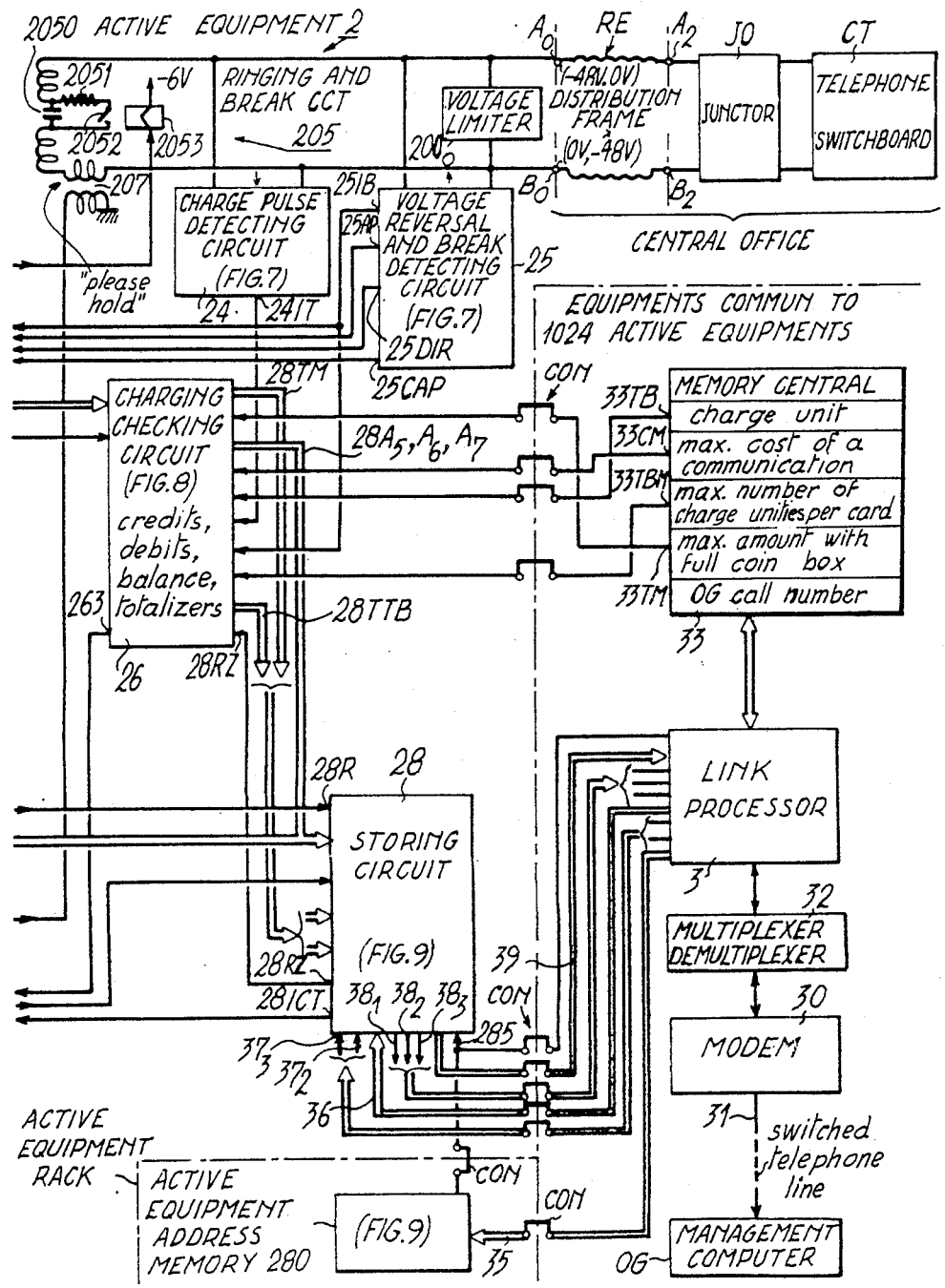

With reference to FIGS. 4A and 4B, the active equipment 2 takes the form of a printed circuit board plugged into the above mentioned frame. The active equipment 2 is preferably located close to the local central office of the public telephone apparatus. More exactly, the active equipment comprises two terminals $A_1$ and $B_1$ connected to terminals A and B of the passive equipment 1 (FIG. 1B) via the telephone line proper under constant dc voltage, and two terminals $A_0$ and $B_0$ connected to the corresponding terminals $A_2$ and $B_2$ of a corresponding junctor J0 of a telephone switchboard CT in the local central office via a distribution frame RE in the central office. As can be seen in FIGS. 4A and 4B, the active equipment 2 also partly consists of a quadripole 20 interconnected in the telephone line and comprising two voltage limiters $200_1$ and $200_0$ across which various circuits included in the active equipment 2 are connected in parallel. Voltage limiter $200_1$ across terminals $A_1$ and $B_1$ protects the circuits against currents flowing in the line between the active and the passive equipments, while voltage limiter $200_0$ across terminals $A_0$ and $B_0$ protects the circuits against currents originating in the switchboard CT, such as an 80 V and 50 or 25 Hz ringing current.

On the telephone line side, between terminals $A_1$ and $B_1$ and a filter 201 having telephone passband of 300 to 3400 Hz, the active equipment 2 comprises a receiving and decoding circuit 21 detecting the signalling carrier frequencies $F_1$ to $F_5$ transmitted from the passive equipment 1, and an encoding and transmitting circuit 22 transmitting the signalling carrier frequency $F_6$ to the passive equipment 1, as well as a double symmetrical transformer 202 constituting a telephone blocking circuit. On the passive equipment side, a first secondary winding of transformer 202 is connected to terminals $A_1$ and $B_1$ to which circuits 21 and 22 are connected in parallel, and comprises at its mid-point a capacitor 2030 having terminals supplied at 0 V and $-48$ V through make contacts 2031 and 2032 controlled by a relay 2033. Members 2030 to 2033 constitute a power supply bridge 203 for applying a $-48$ V dc voltage to the telephone line and thus for remote supplying the passive equipment 1. Between a second secondary winding and a first primary winding of the transformer 202 are connected two blocking diodes 2020. When a nil voltage is applied to a mid-point 2021 of the second secondary winding, the diodes 2020 block bidirectional transmission of the audiofrequency voice signals between the passive equipment 1 and the central office thereby suspending a communication between the user of the public telephone apparatus and the remote subscriber. Blocking of diodes 2020 occurs when the balance of the communication in progress becomes negative for at least $t_{21}=6$ s.

Filter 201 is connected to a second primary winding of transformer 202 on the passive equipment side, as well as to a secondary winding of another transformer 204 on the telephone central office side. In the middle of a primary winding of transformer 204 is interconnected a capacitor 2050 connected in parallel with a series combination of a resistor 2051 and a contact 2052. Contact 2052 is controlled by a relay 2053. Members 2051 to 2053 constitute a ringing and break circuit to simulate, on the CT switchboard side, openings and closings of the telephone loop during user hook-off, dialling with the decimal keyboard CD and user hook-off for an outgoing call. Between the primary winding of transformer 204 and voltage limiter $200_0$, a voltage reversal and break detecting circuit 25 and a charge pulse detecting circuit 24 that is connected to a charge checking circuit 26, are connected in parallel to terminals $A_0$ and $B_0$.

Circuit 25 detects three voltages applied by the switchboard across terminals $A_0$ and $B_0$. The first voltage corresponds to the rest status, outside the voice signal exchange phase of a telephone communication, and sets terminal $A_0$ and $B_0$ to $-48$ V and 0 V. A second voltage sets terminals $A_0$ and $B_0$ to 0 V and $-48$ V and corresponds to the voice signal exchange phase following the first reversal of the central battery voltage terminating the communication establishment phase. A third voltage corresponds to a break in the $-48$ V power supply from the switchboard CT, a break during which the switchboard CT transmits a call ringing current of 80 V modulated at 50 or 25 Hz to terminals $A_0$ and $B_0$ in order to call the public telephone apparatus and thus establish an incoming communication.

Circuit 24 detects 12 kHz charge pulses transmitted by a charging system in the central office allocated to the public telephone apparatus, after the first reversal of the battery and during the voice phase. As is known, the charging period between two charge pulses successively transmitted corresponds to a communication equal to the basic charge unity and depends on the called party subscription area as indicated by a call number access code. The charging checking circuit 26 constantly calculates the credit/debit balance for each communication and thus detects any negative balance in order to interrupt the communication either briefly or definitively. Circuit 26 also establishes the totals in coins and in basic charge unities since the last withdrawal of the coin box contained in compartment 110 of the public telephone apparatus.

The quadripole 20 also comprises a transformer 206 between terminal $B_1$ and the first secondary winding of double transformer 202 as well as a transformer 207 between the primary winding of transformer 204 and terminal $B_0$. Transformers 206 and 207 inject into the telephone line, and to the public telephone and the central office respectively, "no more credit" and "please hold" tones as soon as the balance of the communication in progress becomes negative and no coin or card with credit remaining is present in the passive equipment.

As can be seen in FIGS. 4A and 4B, the active equipment comprises, in addition to circuits 20 to 26 already mentioned, a telephone communication monitor 27, a storing circuit 28 and a time base 29. Monitor 27 is the "brain" of active equipment 2 and is connected to all the other circuits for centralization and analysis of all information and for taking all appropriate decision, notably during the course of a communication. Storing circuit 28 includes 32 memory blocks, eighteen of which are intended to record anomalies indicated by the charging checking circuit 26 and the monitor 27 and twelve of which are intended to record six digits giving the account of the coins and six digits giving the number of the charge unities delivered by the charging checking circuit 26 and totalized since the last coin box withdrawal. In fact, out of the eighteen memory blocks, eight memory blocks are used here, the others blocks remaining available for other uses not falling within the scope of the invention.

Figure 5:
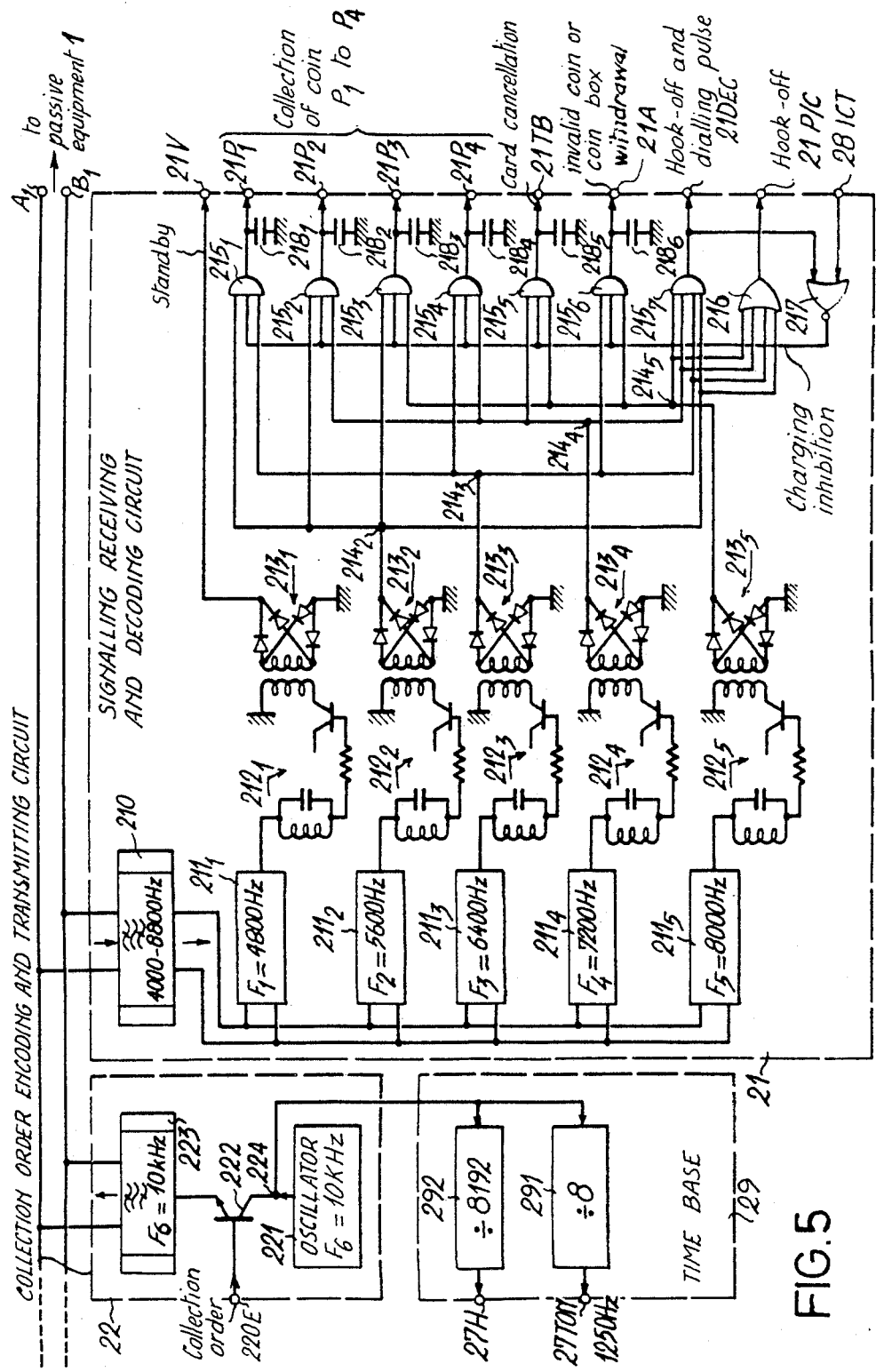
FIG. 5 shows in detail a signalling receiving and decoding circuit and a collection order encoding and transmitting circuit included in the second equipment on the first equipment side.

As shown in FIG. 5, frequencies $F_1$ to $F_5$ are detected in the receiving and decoding circuit 21 via bandpass filters $211_1$ to $211_5$ connected in parallel to a wideband filter 210 of 4000 to 8800 Hz, and followed by tuned amplifiers $212_1$ to $212_5$ and full-wave rectifiers $213_1$ to $213_5$ respectively. Inputs of filter 210 are connected to terminals $A_1$ and $B_1$ of the telephone line on the passive equipment 1 side. Outputs 21V and $214_2$ to $214_5$ of rectifiers $213_1$ to $213_5$ each delivers a dc voltage at high level "1" when the respective frequency $F_1$ to $F_5$ is detected. A set of six three-input AND gates $215_1$ to $215_6$ and a four-input AND gate $215_7$ decodes all frequencies $F_2$ to $F_5$ to respectively signal collections of coins $P_1$ to $P_4$ to outputs $21P_1$ to $21P_4$, debiting of a charge unity from a prepaid card on output 21TB, an anomaly such as collection of an invalid coin or opening of the coin box compartment and/or withdrawal of the coin box on output 21A, and a communication request or dialling pulses on output 21DEC. The signals at outputs $21P_1$ to $21P_4$, 21TB, 21A and 21DEC are similar to those applied to terminals $14P_1$ to $14P_4$, 13TB, 12A and to the output of gate 157 in the passive equipment (FIG. 3). Thus terminal $214_2$ is connected to inputs of gates $215_1$, $215_2$ and $215_3$, terminal $214_3$ to inputs of gates $215_1$, $215_4$ and $215_6$, terminal $214_4$ to inputs of gates $215_2$, $215_4$, and $215_5$, and terminal $215_5$ to inputs of gates $215_3$, $215_5$ and $215_6$. The four inputs of gate $215_7$ are connected to terminal $214_2$ to $214_5$ respectively.

Circuit 21 also comprises an OR gate 216 having four inputs connected to terminals $214_2$ to $214_5$, and a NOR gate 217 having two inputs connected to terminal 21DEC and an output terminal 28ICT of storing circuit 28. An output of gate 217 is connected to third inputs of AND gates $215_1$ to $215_6$ in order to close these gates during reception of the combination of frequencies $F_2$ to $F_5$ corresponding to the dialling phase using the keyboard CD, or during transmission of the digits giving the total amounts of coins and charge unities from the storing circuit 28 to the management computer OG in order to inhibit the counting functions in the charging checking circuit. Capacitors $218_1$ to $218_6$ shunt connected at the outputs of gates $215_1$ to $215_6$ respectively, delay the polarization of respective output terminals $21P_1$ to $21P_4$, 21TB and 21A by a few nanoseconds in order to take into account the opening time of AND gate $215_7$. An output 21P/C of OR gate 216 is connected to a trigger input $D_1$ of a timer $271_1$ in monitor 27 shown in FIG. 6A. As will be seen later on, timer $271_1$ derives a time delay $t_1=130$ s to check the time taken to establish a communication in response to the detection of one of frequencies $F_2$ to $F_5$. Thus, from the start of the communication, the correct operation of all the circuits monitoring signalling and charging is checked.

Indeed, as will be seen later, if one or more of frequencies $F_2$ to $F_5$ is not received, the AND gate $215_7$ does not control ringing and breaking relay 2053 on the local switchboard CT side, while only reception of one of frequencies $F_2$ to $F_5$ opens OR gate 216 and triggers time delay $t_1 = 130$ s in timer $271_1$ (FIG. 6A). After time delay $t_1$, and if no communication has been established, monitor 27 records a non-valid communication and releases the charging system. Similarly, in the other transmission direction, link between the calling and called parties is dependent on correct reception of a 12 kHz charge pulse from the switchboard CT, the correct transmission and reception of frequency $F_6$ and, in return, correct reception of one of signals indicating actual collection.

The encoding and transmitting circuit 22 and the time base 29 are also shown in FIG. 5.

Circuit 22 comprises an oscillator 221 oscillating at frequency $F_6 = 10000$ Hz, a transistor 222 and a bandpass filter 223 having a narrow band centered on frequency $F_6$. An output 224 of oscillator 221 is connected to an input of filter 223 via a collector-emitter junction of transistor 222, as well as to inputs of two frequency dividers 291 and 292 included in time base 29. A base 220E of transistor 222 receives a collection order pulse from the charging checking circuit 26 in order to turn on transistor 222 and transmit frequency $F_6$ on the telephone line through filter 223 connected to terminal $A_1$ and $B_1$ on the passive equipment 1 side. Transistor 222 amplified the $F_6$ signal and matches the load at the output of oscillator 221.

Frequency dividers 291 and 292 are binary counters and divide frequency $F_6 = 10000$ Hz by 8 and 8192 respectively, in order to provide clock signals to two clock inputs 27TON and 27H of monitor 27. The first clock signal at terminal 27TON has a frequency of 1250 Hz for transmission respectively as "no more credit" and "please hold" tones to the calling party passive equipment 1 and to the called party through the switchboard CT in the local central office. The second clock signal at terminal 27H is delivered to clock terminals $H_1$ to $H_3$ and $H_5$ of timers $271_1$ to $271_3$ in monitor 27 in order to determine various significant times during the course of a communication.

Figure 7:
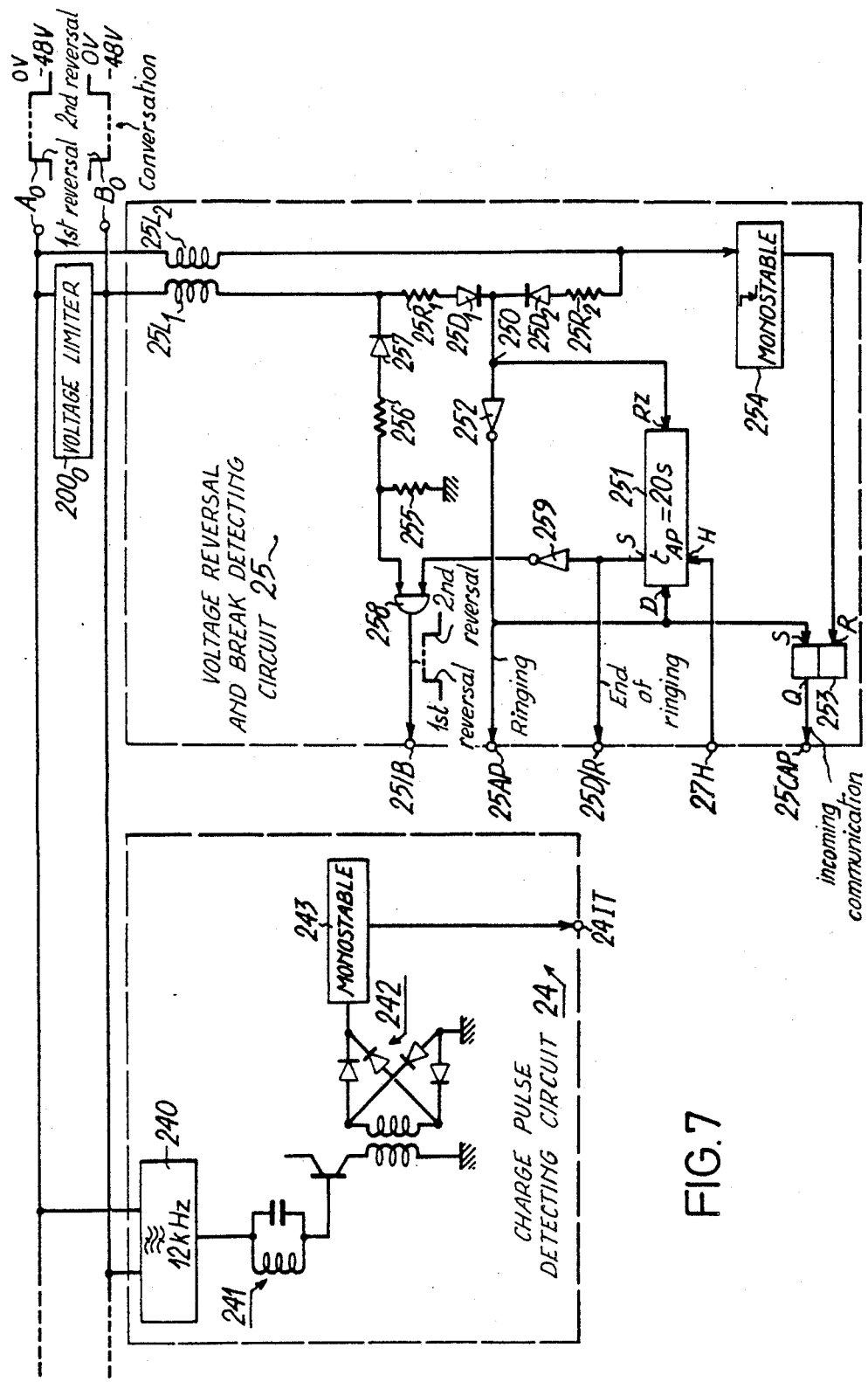
FIG. 7 shows in detail a charge pulse detecting circuit and a voltage reversal and break detecting circuit included in the second equipment on the central office side.

Before presenting the operation of monitor 27 shown in FIG. 6, a brief description of circuits 24 and 25 shown in FIG. 7 is given.

The charge pulse detecting circuit 24 comprises a bandpass filter 240 centered on the 12 kHz modulation frequency of the charge pulses transmitted by the charging system of switchboard CT and received via terminals $A_0$ and $B_0$. A tuned circuit 241 and a full wave rectifier 242 at the output of filter 240 amplify and demodulate the detected charge pulses which are then calibrated by a non retriggerable monostable flip-flop 243. An output 241T of flip-flop 243 transmits the calibrated charge pulses to the charging checking circuit 26.

The calibrated pulses have a width appreciably greater than that of the detected pulses in order to cancel out the effects which could lead to charging errors because of microbreaks affecting reception of the 12 kHz frequency delivered from the switchboard CT. In addition, it is to be noted that, contrary to the majority of current public telephone apparatuses, the charge pulses are not transmitted to the public telephone apparatuses, since filter 201 (FIG. 4) does not allow such a transmission.

The voltage reversal and break detecting circuit 25 shown in FIG. 7 comprises two networks each of which includes an inductor $25L_1$, $25L_2$, a resistor $25R_1$, $25R_2$ and a forward-biased diode $25D_1$, $25D_2$ connected in series. Terminals of inductors $25L_1$ and $25L_2$ are connected to the line terminals $A_0$ and $B_0$, and cathodes of diodes $25D_1$ and $25D_2$ are connected to a common terminal. Terminal 250 is connected to a reset input RZ of a timer 251 having an input H receiving the clock signal from terminal 27H of time base 29 and establishing a duration of $t_{AP} = 20$ s for calling the public telephone apparatus. Terminal 250 is also connected to an output terminal 25AP of circuit 25 via an inverter 252 to signal to the monitor 27 a call from a remote party, and to a trigger input D of timer 251 and an input S of a RS flip-flop 253. An input R of flip-flop 253 is connected to a terminal common to inductor $25L_2$ and resistor $25R_2$ via a monostable flip-flop 254 triggerable by falling edge.

In addition, circuit 25 comprises two resistors 255 and 256 and a forward-biased diode 257 interconnected between a ground referenced terminal and a terminal common to inductor $25L_1$ and resistor $25R_1$. A terminal common to resistors 255 and 256 is connected to a first input of AND gate 258 having a second input connected to an output S of timer 251 via an inverter 259. An output 25IB of gate 258 constitutes an output of circuit 25 for signalling battery reversal, and more particularly for signalling a voice signal exchange phase to the monitor 27 and to the charging checking circuit 26.

Whatever the mode of power supply from the switchboard CT battery to line terminals $A_0$ and $B_0$, terminal 250 is always biased with $-24$ V, which signals line power supply on the switchboard side to monitor 27. A power supply break in response to a call by a remote subscriber, as will be seen later on, sets terminals 250 to state "0" and thus output terminal 25AP to state "1".

When the line is at rest, outside a conversion phase, that is when terminals $A_0$ and $B_0$ are at $-48$ V and 0 V, diodes $25D_1$, $25D_2$ and 257 block all flowing of current. Seen from the switchboard, an end of the telephone line relative to circuit 25 is "open". At this time, networks $25L_1$ to $25D_2$ have no counteracting effect on any activation of the ringing and breaking relay 2053. In the rest state, the first input of AND gate 258 is biased with 0 V, corresponding to logic state "0".

After a first reversal of the battery voltage, indicating the start of a conversation phase in a telephone communication, terminals $A_0$ and $B_0$ are at 0 and $-48$ V, diode 257 conducts, and the first input of gate 258 is biased with $-6$ V, corresponding to logic state "1". Resistors $25R_1$, 255 and 256 have resistances such that in no case subsequently networks $25L_1$ to $25D_2$ neutralize activation of relay 2053 which has to signal the end of a communication to the switchboard CT by opening the line.

MONITOR

The structure and operation of monitor 27 is now described with reference to FIGS. 6A and 6B, together with the structure and operation of the charging checking circuit 26 shown in FIG. 8. Monitor 27 notably comprises six timers $271_1$ to $272_5$ setting respective predetermined time delays of $t_1 = 130$ s; $t_{21} = 6$ s, $t_{22} = 13$ s and $t_{23} = 26$ s; $t_3 = 6$ s; $t_4 = 102$ ms and $t_5 = 6$ s, for determining various significant times during a communication and thus checking the communication phases and signalling anomalies. At the end of the abovementioned respective time delays, outputs $S_1$; $S_{21}$, $S_{22}$, $S_{23}$; $S_3$, $S_4$ and $S_5$ pass to state "1". Each of timers $271_1$, $271_2$, $271_3$ and $271_5$ is a flip-flop counter receiving a clock signal delivered from time base 29 (FIG. 5) at a respective input $H_1$, $H_2$, $H_3$ and $H_5$, via terminal 27H. Timer $271_4$ is also a flip-flop counter receiving a 1250 Hz clock signal from time base 29 on input $H_4$, via terminal 27TON. Each timer $271_1$ to $271_5$ is triggered by a state "1" on respective input $D_1$ and $D_5$ and reset by a "1" on respective input $RZ_1$ to $RZ_5$.

Various other logic members includes in the monitor 27 are cited during the following description of the various phases of an outgoing communication, a coin box withdrawal and an incoming communication.

(A) Rest phase

When the printing circuit board supporting active equipment 2 is plugged in, a transistor $272_1$ is turned on and activates power supply relay 2033 via monitor output 27AL. Contacts 2031 and 2032 in the power supply bridge 203 are closed to supply the passive equipment 1 with 48 V through terminals $A_1$–$B_1$ and A–B of the telephone line. Simultaneously, the failure to receive frequency $F_1$ during startup of passive equipment 1 holds output terminal 21V of the receiving circuit 21 at state "0", which triggers timer $271_2$ via inverter $273_1$. It is recalled that timer $271_2$ sets three time delays $t_{21}$, $t_{22}$ and $t_{23}$ equal to 6, 13 and 26 seconds respectively, at expiry of which outputs $S_{21}$, $S_{22}$ and $S_{23}$ are at state "1". Then, very quickly, the general power supply 104 in the passive equipment 1 powers all the circuits in it, and standby frequency $F_1$ is transmitted normally to the active equipment well before the end of time delay $t_{23}=26$ s. Terminal 21V connected to a reset terminal $RZ_2$ of timer $271_2$ is then at "1" and resets timer $271_2$. The passive equipment is then ready to establish a communication and the active equipment is ready to monitor said communication.

Failure to receive frequency $F_1$ after $t_{23}=26$ s following powering of the telephone line, sets to "1" an anomaly input $28A_1$ of the storing circuit 28 via AND gate $274_1$ having two inputs connected to output $S_{23}$ of timer $271_2$, and to the output of inverter $273_1$ and input $D_2$ of timer $271_2$. The output of gate $274_1$ is also connected to a base of transistor $272_1$ through an inverter $273_2$ and turns off transistor $272_1$ which stops the power supply to the passive equipment and places it in out-of-service mode. Output $28A_1$ thus indicates a passive equipment power supply failure due for example to a failure in the $F_1$ frequency transmitting and receiving means including notably circuits $150_1$, $152_1$, $211_1$ and $213_1$ (FIGS. 3 and 5), or an abnormal attenuation, or line cut between terminals A, B and $A_1$, $B_1$. This anomaly is signalled to the management computer OG. After repair, the passive equipment is automatically restarted by the active equipment as soon as frequency $F_1$ is received.

(B) Hook-off phase

In passive equipment 1, insertion of a prepaid card with remaining credits into mechanism 13 or insertion of at least one coin into mechanism 11 sets the output 14P/C of the switching circuit 14 (FIG. 2C) to "1", which simulates calling party hook-off by opening AND gate 157 (FIG. 3) triggering transmission of frequencies $F_2$ to $F_5$ to the active equipment. Output 21DEC of the receiving circuit 21 passes to state "1" and turns on a transistor $272_2$ through a diode $275_1$. The collector of transistor $272_2$ activates, via an output terminal 27AC, the ringing and breaking relay 2053 which closes contact 2052. The telephone line on the switchboard side is looped, which simulates hook-off as in a conventional telephone set with a hook proper. If one of frequencies $F_2$ to $F_5$ is not received in circuit 21, no hook-off operation is detected by the switchboard CT, gate $215_7$ remaining closed. However, reception of any one of the four frequencies $F_2$ to $F_5$ is sufficient to set output 21P/C of OR gate 216 in circuit 21 to "1" and trigger timer $271_1$.

In all the abovementioned cases, the timer $271_1$ sets a time delay of $t_1=130$ s which is allocated for dialling, ringing, called party reply and reception of a first collection order at frequency $F_6$ by passive equipment 1 which follows the first charge pulse transmitted from the switchboard CT to the active equipment 2. At the end of the time delay $t_1=130$ s, output $S_1$ of timer $271_1$ passes from "0" to "1", which triggers timer $271_3$ through a four-input OR gate $276_1$. Output $S_3$ of timer $271_3$ connected to output $RZ_3$ thereof then turns off transistor $272_1$ through a diode $275_1$ for a time $t_3=6$ s. The power supply of the passive equipment 1 is then cut off for time $t_3$ by deactivation of relay 2033. Such a power supply break triggers refunding of coins still present in the storage slides of mechanism 11 and/or ejection of the card from mechanism 13, at the end of a telephone communication.

In addition, at the end of time delay $t_1=130$ s, output $S_1$ of timer $271_1$ sets inputs of three two-input AND gates $274_2$ to $274_4$, to "1". Other inputs to gates $274_2$ to $274_4$ are connected respectively to output 21DEC of receiving circuit 21 directly and via an inverter $273_3$. Thus, if at least one of frequencies $F_2$ to $F_5$ is not received after $t_1=130$ s following the hook-off phase indicated by transmission of at least one frequencies $F_2$ to $F_5$, an anomaly input $28A_2$ of storage circuit 28 connected to the output of AND gate $274_3$ passes to "1". This indicates an anomaly in the operation of the passive equipment or the active equipment, such as failure of one of the means for transmitting or receiving one or more frequencies $F_2$ to $F_5$, or an abnormal attenuation of the line across terminals AB and $A_1B_1$.

In a normal case in which all frequencies $F_2$ to $F_5$ are received at the end of time delay $t_1=130$ s, the end of the communication is marked, as already stated, by a brief break in the power supply of the passive equipment for time $t_3=6$ s and terminal $28A_1$ stays at "0". In this case, a clock input $H_7$ of a counter 277 connected to an output of AND gate $274_2$ passes to "1" and increments the counter 277 by one unity. A reset input $RZ_7$ of counter 277 is connected to a battery reversal output 25IB of circuit 25 and resets counter 277 in response to each battery reversal originating from switchboard CT corresponding to hook-off by the called party. Counter 277 comprises three binary stages and has an output $S_7$ constituting a third anomaly input $28A_3$ of storing circuit 28 connected to the base of transistor $272_1$ via an inverter $273_7$. Thus, when at least eight consecutive call attempts fail, chiefly due to a dialling incident on the keyboard CD or other incident during establishment of the communication, such as absence of charge pulse or failure of switchboard CT, the count of counter 277 remains blocked at eight and the passive equipment is placed in out-of-service mode by blocking transistor $272_1$ and deactivating power supply relay 2033.

In this latter case, restoration of the power supply of passive equipment 1 and resetting of counter 277 are manually controlled by an operator using the management computer OG, this computer having received the anomaly signalling through terminal $29A_3$, as will be seen hereinafter. The operator enters on the computer OG keyboard the address of active equipment 2 and a "restore" code which is transmitted to storing circuit 28 and results in a "1" at output 28R of circuit 28. Output 28R is connected to the base of transistor $272_1$ through an inverter $273_5$ and to input $RZ_1$ of counter 277 through a monostable flip-flop $278_1$. In this case, triggering of flip-flop $278_1$ by a rising edge resets counter 277 whose output $S_7$ turns on transistor $272_1$ to again power passive equipment 1.

(C) Dialling and selection

The detection of four frequencies $F_2$ to $F_5$, reflected by a "1" at terminal 21DEC, following insertion of a coin or a card, closes the ringing and break contact 2052, as already stated. In response to this "hook-off" operation, the switchboard CT transmits the dialling tone to passive equipment 1.

When the multifrequency keyboard CMF is used, the multifrequency dialling signals pass directly through the quadripole 20 without intervention by the other active equipment circuits.

When the decimal keyboard CD is used, dialling pulses of 77 ms modulate the combination of frequencies $F_2$ to $F_5$. The pulses and breaks between these pulses alternately turn on and turn off transistor $272_2$ and are repeated towards telephone switchboard CT by closings and openings of the ringing and break contact 2052 and thus loopings and unloopings of the line. Staccato triggering of timer $271_1$ will only cease when transmission of frequencies $F_2$ to $F_5$ is stopped normally by the passive equipment in response to the first collection order pulse modulating frequency $F_6$, this stoppage being effected by flip-flop 158 (FIG. 3). Breaks of 33 ms between the dialling pulses do not permit stoppage of the time delay sequence $t_1 = 130$ seconds. Timer $272_1$ will only be stopped by an interrupt greater than 102 ms in the dialling stream $F_2$ to $F_5$ in order to discount the 33 ms dialling pauses during the 130 second total. This result is obtained by means of timer $271_4$ with delay $t_4 = 102$ ms which is triggered by breaks in frequencies $F_2$ to $F_5$ via terminal 21DEC, an inverter $273_6$ and its input $D_4$, which is reset by re-establishment of frequencies $F_2$ to $F_5$ via terminal 21DEC and its input $RZ_4$ and finally which controls after 102 ms, via its output $S_4$, a two-input OR gate $276_2$ and its input $RZ_1$, stoppage and resetting of timer $271_1$. It is recalled that the 130 seconds correspond to a maximum time lapse between the moment the user "hooks off" and the moment he enters contact with his correspondent. It should be stated that timer $271_1$ is not retriggered by dialling breaks received at input $D_1$.

If the calling user does not press the refund button 115 (FIG. 2A), a dialling incident, a called party line busy, a called party hook-off fault, or a charging failure in switchboard CT leads to the situation already described, that is expiry of time delay $t_1 = 130$ s, release of the telephone line, refund of coin or ejection of card by cutting the power supply for time $t_3 = 6$ s and incrementation of counter 277 by one unity.

(D) Called party reply

Hook-off by the called party results in a first reversal of the battery and setting of the line terminals $A_0$ and $B_0$ on the switchboard CT side to 0 and $-48$ V. This first battery reversal results in a "1" at output 25IB of voltage reversal and break detecting circuit 25 (FIG. 7). Terminal 25IB is connected to the base of transistor $272_2$ via a diode $275_3$ and thus confirms conducting condition of transistor $275_2$. Activation of relay 2053 is thus ensured when transmission of frequencies $F_2$ to $F_5$ ceases and terminal 21DEC returns to "0", after reception of the first collection order by the passive equipment and until the end of the communication. Thus, first battery reversal takes place before the break in frequencies $F_2$ to $F_5$.

As already stated, the first battery reversal resets counter 277. This has no effect on timer $271_3$ intended for a power supply cut to the passive equipment, by means of a monostable flip-flop $278_2$ triggerable by falling edges and thus in response to a second battery reversal signalling the end of the communication. The flip-flop $278_2$ has an input connected to terminal 25IB and an output connected to input $D_3$ of timer $271_3$ via OR gate $276_1$. In addition, the first battery reversal is accompanied by a first 12 kHz charge pulse transmitted by the switchboard CT and detected by detecting circuit 24 whose output 24IT transmits a calibrated charge pulse.

With reference to the charging checking circuit 26 shown in FIG. 8, terminal 24IT is connected to control inputs of 12 AND gates $260_1$ to $260_{12}$, and to a clock input of a card charge unity debit register 26DTB. Other inputs of AND gates $260_1$ to $260_{12}$ are connected through a twelve-wire bus 33TB to the central memory 33 which delivers the three-digit cost of a basic charge unity in centimes, each digit being encoded by a 4-bit word. Outputs of gates $260_1$ to $260_{12}$ are connected to twelve inputs of the coinage debit register 26DM. Thus, in response to a calibrated charge pulse at terminal 24IT, the register 26DM is incremented by the cost of a basic charge unity, and register 26DTB is incremented by one unity. The counts in registers 26DM and 26DTB are constantly compared with the counts in a coinage credit register 26CRM and a card charge unity credit register 26CRTB by means of a coinage comparator 26CM and a basic charge unity comparator 26CTB respectively. Register 26CRM has inputs connected to outputs $21P_1$ to $21P_4$ of receiving circuit 21, and add the value of a coin collected to the coinage credit count whenever the corresponding terminal $21P_1$ to $21P_4$ passes to "1". Similarly, register 26CRTB is connected to output 21TB of receiving circuit 21 and is incremented by one unity in response to a "1" at output 21TB corresponding to cancellation of a basic charge unity in a prepaid card. An output of comparator 26CM passes to "1" whenever the coinage balance equal to the difference between the counts in the two registers 26CRM and 26DM is negative. An output of comparator 26CTB passes to "1" whenever the basic charge unity balance equal to the difference between the counts in registers 26CRTB and 26DTB is negative.

The four registers 26DM, 26DTB, 26CRM and 26CRTB are intended for management of a single telephone communication and are reset to zero by rising and falling edges on terminal 25IB corresponding to the first and second battery reversals marking the limits of the conversation phase. This reset is obtained by means of an inverter 261 interconnected to terminal 25IB and reset inputs RZ of registers 26DM, 26DTB, 26CRM and 26CRTB via diodes 262 respectively.

In response to the first charge pulse following the first battery reversal, the coinage and charge unity balances derived by comparators 26CM and 26CTB become negative, which triggers transmission of a collection order at frequency $F_6$. For this purpose, outputs of comparators 26CM and 26CTB are connected to two inputs of an AND gate 263 having another input connected to terminal 25IB and having an output connected to input 220E of transmitting circuit 22. Thanks to gate 263, no collection order can be transmitted before hook-off by the called subscriber as signalled by the first battery reversal.

(E) Credit exhausted (E1) When at least one coin is present in the storage slides of mechanism 11, the coin having the lowest value is collected in response to the first collection order, which increments the coinage credit register 26CRM by the value of the collected coin. For a basic charge cost of for example 0,75 FF, as is the case at present in France, and according to the value of the last coin inserted or collected before the end of the communication, apart from duration $t_{21} = 6$ s granted for insertion of a coin with risk of reception of "no more credit" tone, the user has a free communication period corresponding to a cost of $(2 \times 0.75) - 1 = 0.50$ FF for a coin $P_1 = 1$ FF, of $(3 \times 0.75) - 2 = 0.25$ FF for a coin $P_2 = 2$ FF, of $(7 = 0.75) - 5 = 0.25$ FF for a coin $P_4 = 5$ FF and of $(14 \times 0.75) - 10 = 0.50$ FF for a coin $P_4 = 10$ FF. However, a loss of this nature is of little significance for the authorities since it is compensated by a minimum collection of 1 FF at the beginning of communication and by credits remaining available at the end of the communication. This particularity, which corresponds to charging marked at the end of the period due, has an inverse effect and works to the advantage of the utility if the charging precedes the period due. This situation is not applicable to this system alone and currently exists in the system in service. It is the result of simple chance that the basic charge unity is a common divisor of the values of the various coins in use. Only the prepaid card allows a more accurate payment mode.

In response to the first validated and collected coin, register 26CRM is incremented by the value of this coin, the coinage balance then becomes positive and the output of comparator 26CM passes to "0" to close AND gate 263, which stops transmission of frequency $F_6$. Similarly, if a prepaid card is present in mechanism 13, reception of frequency $R_6$ in the passive equipment results in the transmission of a pulse signifying cancellation of a basic charge unity from the card and setting of terminal 21TB to "1", which credits register 26CRTB with one unity and stops transmission of freqnency $F_6$. Thus, as soon as one of comparators 26CM and 26CTB detects a positive balance, the transmission of frequency $F_6$ is stopped, and will again be triggered as soon as the two outputs of comparators 26CM and 26CTB are again at "1", i.e. in response to passage of the two coinage and charge unity balances from positive or nil to negative.

It is recalled that when coins are present in the storage slides of mechanism 11 or a prepaid card having credits remaining is inserted in mechanism 13, the collection order signalled by frequency $F_6$ is transmitted to the passive equipment as soon as comparators 26CM and 26CTB detect a negative balance. The received collection order triggers normally activation of one of relays $113_1$ to $113_4$ through switching circuit 14 (FIG. 2) to collect a coin, or set input 13E to "1" to cancel a charge unity in the card. This operation is indicated by setting to "1" of one of terminals $14P_1$ to $14P_4$ or of terminal 13TB.

If for any reason a coin is not collected, due for example to a faulty corresponding relay $113_1$ to $113_4$, or if a charge unity is not cancelled in a card, the balance remains negative, the frequencies $F_1$ to $F_6$ are transmitted and the timer $271_2$ is not triggered. In this case, all terminals $21P_1$ to $21P_4$ and 21TB remain at "0" and the communication may be continued free of charge. To remedy this situation, monitor 27 comprises an AND gate $274_5$ having two inputs connected to terminal 21V and to the output of gate 263, and having an output connected via an inverter $273_6$ to reset terminal $RZ_5$ and directly to trigger terminal $D_5$ of timer $271_5$. Output $S_5$ of timer $271_5$ is connected to input $D_3$ of timer $271_3$ via OR gate $276_1$ and to an anomaly input $28A_4$ of storing circuit 28.

As soon as the collection order is transmitted by gate 263 to the passive equipment, gate $274_5$ triggers timer $271_5$, frequency $F_1$ normally being transmitted when there is still a coin or card with remaining credit in the passive equipment. If, before the end of time delay $t_5 = 6$ s established by timer $271_5$, one of terminals $21P_1$ to $21P_4$ and 21TB is gone to "1", one of the two balances is again positive and the transmission of frequency $F_6$ stops, timer $271_5$ returning to "0" until the next collection order. The communication is then continued until there are no more coins or credits on the card or until the calling or called party hangs up. During the communication, a comparator 26MMAX in circuit 26 shown in FIG. 8, constantly compares the coinage credit outputting from register 26CRM with the maximum cost of a communication delivered from output bus 33CM from the central memory (FIG. 4B). When a communication is abnormally long, an output of comparator 26MMAX sets an anomaly input $28A_5$ of storing circuit 28 to "1". Similarly, during the communication, a comparator 26TBMAX included in circuit 26 constantly compares the charge unity credit outputting from register 26CRTB with the maximum number of basic charge unities in a prepaid card, delivered from output bus 33TBM from memory 33. An output of comparator 26TBMAX sets an anomaly input $28A_6$ of storing circuit 28 to "1" when the communication using the card is abnormally long. In both these cases, the "excessively long communication" anomaly is transmitted for information to the management computer OG.

However, if the balance is still negative and the collection order is again transmitted after time delay $t_5 = 6$ s, output $S_5$ of timer $271_5$ passes to "1" and triggers timer $271_3$ and thus the break in the power supply of the passive equipment and the end of the communication, with refund of the coin or ejection of the card. In addition, terminal $28A_4$ is at "1", which signals an anomaly written in storing circuit 28. This anomaly is transmitted to the management computer OG via processor 3 which, in return, receives an acknowledgement signal. It is to be noted that the failure to place the passive equipment in out-of-service mode for this type of anomaly is intentional. Indeed, this anomaly is a result of:

either a technical failure which has just occured, in which case, the following communication(s) will give rise to characterized anomalies signalled by other anomaly inputs $28A_1$ to $28A_3$ and $28A_8$ for example, or a stockage slide blocking in the switching device of mechanism 11, the end of the communication and the refund being adapted to find again a normal operation condition, or a fraudulent action, the thwarting of this attempt by breaking the communication seems to be sufficient and does not warrant placing the passive equipment in out-of-service mode.

Several anomalies indicated to the management computer by termial $28A_4$ lead in principle to a series of fruitless call attempts, similar to the anomalies signalled at terminal $28A_3$, and require a check of the correct operation of the coin collecting mechanism 11 with regard to the slides and the level detectors $117_1$ to $117_3$ and the correct operation of the card collecting mechanism 13 with regard to the prepaid card cancelling and checking circuit.

In addition, as already stated, a charge pulse delivered from the switchboard CT simultaneously increments the coinage debit register 26DM with a cost in centimes of a basic charge unity and the charge unity debit register 26DTB with a charging unity. When both coinage and charge unity balances are negative for a conversation phase established after first battery reversal, this causes the transmission of the collection order to the passive equipment, via AND gate 263.

If the collection is in coinage, one of terminals $21P_1$ to $21P_4$ credits the count of register 26CRM with an amount equal to the value of the collected coin. In addition, one of terminals $21P_1$ to $21P_4$, via OR gate 264 and diode 265, resets the charge unity debit and credit registers 26DTB and 26CRTB. The balance in "cash" is then positive and the balance in charge unities is nil, which stops transmission of the collection order. However, at the moment the collection order is sent, the balance in charge unities is negative by one unity and the balance in coinage is negative by an amount less than the cost of a charge unity.

Instead of continuing payment in coinage, the user changes the payment mode and uses a prepaid card. Verification tests are performed by the card collecting mechanism 13. Mechanisms 11 and 13 are switched in switching circuit 13 in the passive equipment, and a basic charge unity is cancelled from the card, which is signalled by a "1" on the terminal 21TB of the receiving circuit in the passive equipment. The charge unity credit register 21CRTB is then incremented by one unity, and the balance in charge unities becomes nil. Terminal 21TB resets the coinage credit and debit registers 26CRM and 26DM via diode 266. The balance in coinage then becomes nil. Transmission of the collection order is stopped.

The communication is continued using the charge unity balance. If the user again changes his payment mode, either by removing his card, or because it has no credits left, automatically implying payment with coins according to the process already described relative to switching circuit 14, the user then uses coins. Provided that the prior charge unity balance is not negative, the communication continues without transmission of a collection order.

Thus at the moment the user decides to change the payment mode, the credit remaining is not lost. As soon as this credit is exhausted, collection is effected with the other payment mode, the credit corresponding to the coins newly inserted is entered in register 26CRM, while the charge unity debit and credit registers 26DTB and 26CRTB are reset after collection. These operations do not influence a card charge unity totalizer-register 26TTB and a coinage totalizer-register in circuit 26 having inputs connected to terminal 21TB and terminals $21P_1$ to $21P_4$ respectively. The totalizers-registers add, until the next withdrawal of the coin box which resets the totalizer registers, the digits entered in credit registers 26CRTB and 26CRM, as the communications and various payment modes continue.

The payment mode can thus be changed during the course of the communication as many times as one wishes and in any direction. It can be done at any moment without, on the one hand, the credit remaining being lost for the user and, on the other, the debit in the old account being lost at this changeover of account. The debit is exactly transferred to the account of the new mode of payment. It is only after a collection order that the credit and debit registers corresponding to the old mode of payment are reset.

The debit register for the payment mode not used is incremented by one unity upon reception of each charge pulse, and the debit and credit registers for the payment mode not used are reset at each collection according to the payment mode used. In this way, registers are always ready for a change in the payment mode.

The coinage credit and debit register 26CRM and 26DM, and the charge unity credit and debit registers 26CRTB and 26DTB keep and cumulate for the payment mode which concerns them respectively, an account of the communication in progress alone and for a period of time corresponding to a payment mode without changeover.

(E2) If passive equipment 1 receives a collection order when the storage slides contain no more coins or when the prepaid card inserted has no more charge unity credit, output 14P/C of switching circuit 14 is at "0" and output 160 of reception circuit 16 is at "1", in reference to FIG. 3. The output of gate $151_1$ controls stoppage of transmission of standby frequency $F_1$, which is indicated in active equipment 2 by a "0" at output 21V of receiving circuit 21.

As shown in FIG. 6B, terminal 21V is connected to the trigger input $D_2$ of timer $271_2$ through inverter $273_1$ and the reset input $RZ_2$ of timer $271_2$, but also through inverter $273_1$ to inputs of AND gate $274_1$ and a two-input AND gate $274_6$. Another input of gate $274_6$ as well as an input of a two-input AND gate $274_7$ and an input of a two-input AND gate $274_4$ are connected to output 220E of AND gate 263 in the charging checking circuit 26. Other inputs of gates $274_7$ and $274_4$ are connected to outputs $S_{22}$ and $S_{21}$ respectively of timer $271_2$.

When terminal 21V is going from "1" to "0" in response to a collection order without presence of coins or card, or in presence of a card with nil credit, timer $271_2$ is triggered. Simultaneously, an output of gate $274_6$ passes to "1", one of the inputs of this gate connected to the output of AND gate 263 being at "1" because of a negative balance. The outputs of gate $274_6$ and terminal 27TON are connected to a base of a transistor $272_3$ via a diode $275_4$ and a monostable flip-flop $278_3$ self-triggerable by a 300 ms period and via a diode $275_5$ respectively. The 300 ms pulses delivered by flip-flop $278_3$ thus triggered modulate the 1250 Hz clock frequency and are applied to transformers 206 and 207 through a decoupling transformer 279 in order to transmit the "no more credit" tone to passive equipment 1 and the "please hold" tone to the called party via switchboard CT.

At the end of time delay $t_{21}=6$ s following triggering of timer $271_2$, output $S_{21}$ opens gate $274_4$ whose one output, via an inverter $273_4$, turns off transistor $272_4$ having a collector connected to terminal 2021 of telephone blocking circuit 202. Diodes 2020 then momentarily interrupt the voice signals exchanged between the user and the called party.

Then after a period of 7 s, i.e. after time delay $t_{22}=13$ s following triggering of timer $271_2$, output $s_{22}$ of timer $271_2$ passes to "1" if the balance still remains negative and if no coins or card with credit have been inserted into the passive equipment. An output of AND gate $274_7$ being connected to the trigger input $D_3$ of timer $271_3$ via OR gate $276_1$, output $S_3$ of time delay device $271_3$ passes to "0" during $t_3 = 6$ s, which deactivates the power supply relay 2033, and the passive equipment power supply is then cut off, which terminates the telephone communication.

Normally, the power supply to the passive equipment is cut off between $t_{22} = 13$ s and $t_{22} + t_3 = 19$ s following triggering of timer $271_2$ which only returns to zero after time delay $t_{22} + t_3$ and thus after restoration of the power supply to the passive equipment; the standby frequency $F_1$ is again transmitted, timer $271_2$ returns to zero, and the equipments are in the rest phase.

However, if frequency $F_1$ is not transmitted after time delay $t_{22} + t_3 = 19$ s, following an incident during this time delay, such as a line break or failure of means $150_1$ for transmitting frequency $F_1$, timer $271_2$ continues the time delay, and after $t_{23} = 26$ s, turns off transistor $272_1$, which definitively cuts off the power supply to the passive equipment which is then in the out-of-service mode. Output $28A_1$ then signals an anomaly. The power supply is then restored from the management computer OG, and a brief pulse is applied to input 28R, as already stated.

However, in response to the "no more credit" tone during time delay $t_{22} - t_{21} = 7$ s, if the user inserts one or more coins or a card with credit remaining, and terminal 21V returns to "1", thus resetting timer $271_2$, transistor $272_4$ is in conductive condition to re-establish an exchange of voice signals. Validation of the collected coin or debiting of a charge unity increments the credit register 26CRM or 26CRTB and the balance again becomes positive, which closes gate 263 and stops transmission of frequency $F_6$ to the passive equipment.

(F) Hook-on by the called party

Hook-on by the called party causes a second battery reversal detected by the voltage reversal and break detecting 25, reception of a busy tone by the calling user and disconnection of corresponding links, notably in switchboard CT. In response to the second battery reversal, output terminal 25IB of circuit 25 passes from "1" to "0".

Monostable flip-flop $278_2$ in monitor 27 detects a rising pulse edge applied by terminal 25IB and triggers timer $271_3$ via OR gate $276_1$. Output $S_3$ of timer $271_3$ blocks transistor $272_1$ which establishes a power supply break to the passive equipment for $t_3 = 6$s. Any coins present in the storage slides of mechanism 11 are refunded and/or a card present in mechanism 13 is ejected. After time delay $t_3$, the passive and active equipments are at rest.

As already stated, the end of a communication is established normally, either by absence of coins in mechanism 11 and absence of prepaid card in mechanism 13, or by the presence of a card with nil credit in mechanism 13, or by hook-on by the calling user.

Hook-on by the calling user in the passive equipment is normally controlled by pressing button 115 (FIG. 2A). This causes refunding of coins and/or ejection of the card, resulting from the "no more credit" condition and collection order received. The previously described phase E2 is then completed in order to move on to either rest phase A or placing of the active equipment in out-of-service mode. Phase E2 is shortened if the called party hooks-on before expiry of time delay $t_{22} = 13$ s in timer $271_2$ triggered by cessation of transmission of frequency $F_1$. In this latter case, the previous phase F is established.

(H) Called party busy or selection incident

A situation of this nature was described with reference to the end of the dialling and selection phase C.

(I) No reply from called party; coins or card inserted without dialling

If the called party does not hook-off, or the calling user presses button 115 (FIG. 2A) before the end of time delay $t_1 = 130$ s in timer $271_1$ triggered by insertion of a coin or a card with credit remaining, phase G is accomplished. However, if time delay $t_1 = 130$ s expires after insertion of a coin or a card with credit remaining, preceding or otherwise a dialling phase less than $t_1$ without hook-off by the called party, counter 277 is incremented by one unity by output $S_1$ of timer $271_1$ and output 21DEC of gate $215_7$ at "1". Counter 277 will signal a public telephone out-of-service mode after eight such consecutive call attempts, via terminal $28A_3$.

Withdrawing the coin box; Break-in of coin box

In passive equipment 1, opening of the coin box compartment 110 opening contact 117, or withdrawl of the coin box form compartment 111 opening contact 118, causes transmission of frequencies $F_3$ and $F_5$ by the passive equipment (FIGS. 2 and 3), in all normal or abnormal circumstances.

In the active equipment, the detection of at least one of the two frequencies $F_3$ and $F_5$ by OR gate 216 (FIG. 5) triggers timer $271_1$ in monitor 27. The two frequencies $F_3$ and $F_5$ are also detected by AND gate $215_6$ (FIG. 5) having an output connected to another input of AND gate $274_4$ in the monitor. Opening of gate $215_6$ also controls a transfer of informations stored in the registers of the storing circuit 28 to the management computer, as will be seen hereinafter.

In addition, in the passive equipment, opening of one of contacts 117 and 118 interrupts the 6 V power supply to the collection mechanisms 11 and 13, as shown in FIG. 2A. This power supply interrupt prevents a telephone communication being established by the collection personnel or anyone else, when coin box compartment 110 is open. Furthermore, the content of the registers in the charging checking circuit 26 remain fixed during transfer to the management computer.

The management computer OG receives and records "coin box withdrawal" information in the form of amounts of money and charge unities cumulated in the totalizers-registers 26TM and 26TTB since the last passage and recorded in the storing circuit via terminals 28TM and 28TTN (FIG.8). A program in a programmable memory attached to the computer OG is consulted by the computer to read a list of collection staff passage intervals for the public telephone apparatuses, intervals which may be as short as one wishes. By detecting from the list the telephone apparatus address, which transmitted a "coin box withdrawal" information via terminal 21A by comparing the actual moment of withdrawal with the corresponding time interval on the list, the computer OG decides whether opening of the coin box compartment via terminal 21A is normal or fraudulent.

In the event of fraudulent opening, the computer initiates a programmed alert procedure for the transmission of alarms. Simultaneously, via storing circuit 28 and terminal 28R, computer OG proceeds to place the telephone apparatus in out-of-service mode. These procedures are detailed below.

If the withdrawal of the coin box is considered to be normal, the amounts in cash and charge unities are taken from registers 26TM and 26TTB and entered in storing circuit 28, as well as reset of these registers via output terminal 28RZ of circuit 28.

In a normal condition, opening of compartment 110 and withdrawal of the coin box must take place in less that $t_1 = 130$ s and should give rise to no anomalies for transmission to the computer OG. However, an anomaly may be transmitted to the computer OG when the coin box is full. For this purpose, charging checking circuit 26 (FIG. 8) comprises a comparator 26CTM constantly comparing the total amount of coins collected since the last withdrawal, delivered by the output bus of counter 26TM, with the maximum amount which the coin box can contain, delivered by output but 33TM from central memory 33 (FIG. 4). An anomaly input $28A_7$ of storing circuit 28 is set to "1" by an output of comparator 26CTM when the coin box in the apparatus is full. In this case, management computer OG places the apparatus in out-of-service mode and then re-establishes operation, via terminal 28R, when registers 26TM and 26TTB are reset to zero.

However, if following triggering of timer $271_1$, output $S_1$ of this timer passes to "1" at expiry of time delay $t_1$, output $28A_8$ of AND gate $274_4$ passes to "1" and signals an withdrawal anomaly. In this case, the passive equipment 1 is automatically placed in out-of-service mode by the management computer OG. It is recalled that in the case of placing in out-of-service mode by computer OG, the public telephone apparatus is nevertheless returned to service manually and should be done from computer OG by an operator following a process described further on, with reference to memory 28, in order to avoid automatic restoration by means of contacts 117 and 118.

In addition, it is to be noticed that any transmission of one of the frequencies $F_2$, $F_3$, $F_4$ and $F_5$ triggers timer $271_1$ via OR gate 216. This layout ensures a systematic time check in the processing of all signallings transmitted by the passive equipment 1. Thus, in the event of a technical anomaly, triggering of timer $271_1$ results in a "selection inoperative" type message reflected by incrementation of counter 277 by one unity. Eight consecutive incidents of this type lead to signalling by terminal $28A_3$ and the public telephone apparatus is placed in out-of-service mode.

Telephone apparatus called by another public or private telephone apparatus

When the pubic telephone is called for an incoming communication, the active equipment 2 receives a call ringing current at 80 V and 50 or 25 Hz, through line terminals $A_0B_0$ on the switchboard CT side. During the call, voltage limiter $200_0$ stops transmission of the ringing current, and a break in the battery power supply is detected by the voltage reversal and break detecting circuit 25 shown in FIG. 7. As already stated, a break in the power supply on the switchboard CT side implies that terminal 250 has switched from $-24$ V to 0 V and that there is therefore a "1" at output terminal 25AP of circuit 25.

In monitor 27 shown in FIG. 6B, terminal 25AP is connected to the base of transistor $272_3$ via a shunt capacitor 27C and a diode $275_6$. The state "1" at terminal 25AP results in conducting of transistor $272_3$ and thus transmission of a 1250 Hz ringing tone supplied by terminal 27TON, on the one hand, to passive equipment 1 through transformers 279 and 206, and of the other, to the calling party through transformers 279 and 207. The ringing tone is broadcast by loudspeaker HP (FIG. 1A). It is also transmitted to the calling subscriber and clearly informs him that he is calling a public telephone apparatus.

In addition, timer 251 in circuit 25 shown in FIG. 7 has been reset by the battery power supply preceding the ringing tone. Timer 251 is triggered by the passage from "1" to "0" of its reset terminal RZ and the passage from "0" to "1" of its trigger input D as soon as the power supply is cut in response to the call. The time delay set by timer 251 limits the duration of the ringing to the public telephone apparatus to $t_{AP} = 20$ s. There are then two alternatives AP1 and AP2:

(AP1) A user close to the public telephone apparatus inserts a coin before expiry of time delay $t_{AP}$. The coin will be refunded to him at the end of the communication. Reception of the coin in one of the storage slides in passive equipment 1 sets terminal 14P/C (FIGS. 2C and 3) to "1" and opens gate 157 and triggers transmission of frequencies $F_2$ to $F_5$, still together with standby frequency $F_1$, to active equipment 2. Frequencies $F_2$ to $F_5$ are transmitted throughout the duration of the communication, with triggering of timer $271_1$, normally limiting the dialling phase for a called communication, here neutralized as explained below. Terminal 21DEC passes to "1" and activates ringing and break relay 2053 (FIG. 4) in order to close contact 2052, as in the case of an outgoing communication, which loops the line on the switchboard CT side and informs the latter of called user hook-off. The switchboard CT stops transmission of the ringing signal at 50 or 25 Hz in response to line looping and proceeds to the first battery reversal initializing the conversation phase of the incoming communication. In circuit 25 (FIG. 7), terminal 250 passes to 24 V, timer 251 is reset and stopped, the ringing tone is halted by a "0" at terminal 25AP, and output Q of flip-flop 253 passes to "1" which, via output 25CAP of circuit 25 and OR gate $276_2$ of the monitor (FIG. 6), resets, stops and therefore neutralizes timer $271_1$ throughout the duration of the incoming communication. Also, in the receiving and decoding circuit 21 shown in FIG. 5, output 21DEC of AND gate $215_7$ at "1" holds the other AND gates $215_1$ to $215_6$ closed through NOR gate 217, which inhibits the charging checking circuit 28.

However, if during the conversation phase of this incoming communication, break-in or abnormal removal of the coin box takes place, the 6 V power supply is cut by opening of contacts 117 and 118 of compartment 110 in passive equipment 1 (FIG. 2). As already stated, frequencies $F_3$ to $F_5$ are transmitted from the passive equipment to active equipment 2 and signal an anomaly via monitor terminal $28A_8$. Terminal 21DEC passes to "0" since the other frequencies $F_2$ and $F_4$ are not transmitted. Transistor $272_2$ in the monitor is turned off, relay 2053 is deactivated, contact 2052 opens the line on the switchboard CT side and thus interrupts the incoming communication.

The end of the communication is triggered either by the calling party hook-on, or by pressing in the refund button 115, as already described in phases F and G. In particular, the second battery reversal triggers monostable flip-flop 254 in circuit 25 (FIG. 7) and, subsequently, resetting of output Q of flip-flop 253 and terminal 25CAP which places the timer $271_1$ on standby for a future outgoing or incoming communication.

(AP2) If no user inserts a coin before expiry of time delay $t_{AP} = 20$ s, in response to the ringing tone, output S of time delay device 251 passes to "1". This output S is connected to output terminal 25D/R of circuit 25 and also to an input of gate 258 via inverser 259.

State "1" of terminal 25D/R turns on transistor $272_2$ in monitor 27 (FIG. 6A) via diode $275_7$ which simulates user hook-off by closing the ringing and break contact 2052 and thus triggers a first battery reversal by switchboard CT. Furthermore, state "1" of terminal 25D/R holds gate 258 closed and thus inhibits a battery reversal pulse delivered from terminal 251B to monitor 27 and to charging checking circuit 26 during a normal communication.

However, the first battery reversal sets terminal 250 in circuit 25 to −24 V, which resets timer 251 and therefore sets terminal 25D/R to "0" which turns off transistor $272_2$ and opens contact 2052. The loop on the switchboard CT side is again open, which simulates user hook-on.

Thus, after expiry of time delay $t_{AP}=20$ s, there is rapid and automatic hook-off and hook-on. The rapidity of these actions depends on the inertia in the ringing and break relay 2053 (FIG. 4) and results in no charge for the calling subscriber.

Call by the public telephone apparatus to a subscriber but without charging

As for a normal call, the user should insert a coin or card in passive equipment 1 so that active equipment 2 proceeds with hook-off by activating relay 2053 (FIG. 4). Dialling a number but without charging is similar to phase C, except that the time delay $t_1=130$ s of timer $271_1$ triggered by transmission of frequencies $F_2$ to $F_5$ from passive equipment 1 is not stopped by reception of frequency $F_6$ after hook-off by the called party, giving rise to initial battery reversal. In effect, no charge pulse is signalled to the charging checking circuit 26. Subsequently, the contents of debit registers 26DM and 26DC remain at zero and the balances are nil, which keeps AND gate 263 closed (FIG. 8).

A communication is thus established for the time remaining available before expiry of time delay $t_1=130$ s. In practice, the user has a conversation phase of about 100 s for a local call, 80 s for a trunk call or 60 s for an international call. This duration is sufficient for the user to transmit a brief message and ask to be called back.

As for a normal communication, the end of the nonchargeable communication is marked by second reversal of the battery, a cutoff of the 48 V power supply and the refund of the coin or ejectin of the card initially inserted, provided that the user has not already pressed refund and ejection button 115.

STORING CIRCUIT

With reference to FIGS. 9A and 9B, storing circuit 28 comprises, in addition to memory block 280, eighteen anomaly or similar memory blocks $281_1$ to $281_{18}$, twelve memory blocks $282_1$ to $282_{12}$ for digits of the coinage and charge unit totaliser accounts, one memory block for the out-of-service and in service modes 283, and one memory block 284 for resetting totalizer counters 26TM and 26TTB.

All data exchanged between the storing circuit 28, the link processor 3 and the management computer OG are in the form of 4-bit binary words. Such a word permits encoding of each decimal digit 0 to 9 in a totalizer-count, the five remaining words being used for so-called service words A, B, C, D and E which will be defined subsequently. The word "0000" is not used for security reasons.

Memory block 280 comprises a ROM memory containing the 10-bit address word of the active equipment chosen from among 1024 address words for active equipments managed by link processor 3. As already stated, 1024 memory blocks 280 are fixed on a frame containing 1024 boards supporting the active equipment circuits. Each memory block 280 is thus associated with a location of a board in the frame and thus allows to replace the board when it is faulty, easily and quickly. Various connections between memory blocks 280, central memory 33, link processor 3 and the other active equipment circuits are made by means of plug-in connectors denoted by CON in FIG. 4B. The memory block 280 also contains an one-bit RAM memory. This RAM memory signals, via read enable wire 285, to the other memory blocks $281_1$ to $281_{18}$, $282_1$ to $282_{18}$, 283 and 284, that active equipment 2 is called by processor 3 in response to the active equipment 2 address delivered to ROM memory 280 by processor 3, via a 10-wire bus 35.

Each anomaly memory block $281_a$, where integer a varies from 1 to 18, contains a 1-bit ROM memory connected to wire 285, and a 5-bit ROM memory connected to a 5-wire block address bus 36 outputting from processor 3. The 5-bit ROM contains the address of memory block $281_a$ in order to detect it on bus 36 together with a "1" on wire 285 and thus enable reading by processor 3 in three other 1-bit RAM memories included in block $281_a$. The first RAM is connected to monitor 27 or to the charging checking circuit 26 by a respective anomaly input terminal $28A_a$, which, at state "1" calls processor 3. In fact, eight such inputs $28A_1$ to $28A_8$ are used in the illustrated embodiment. The other two 1-bit RAMs in block $281_a$ are intended for signal exchanges with the management computer via the link processor, for mainly reading the content of the first RAM, as will be seen later on. For this, the last two RAMs of block $281_a$ are connected to two write wires $37_2$ and $37_3$ outputting from processor 3, and the three RAMs of block 281 are connected to three read wires $38_1$, $38_2$ and $38_3$ inputting to processor 3.

Memory blocks $282_1$ to $282_{12}$ also each comprise a 1-bit ROM memory connected to wire 285, a 5-bit address RAM memory connected to block address bus 36 and three 1-bit RAM memories having outputs connected to read wires $38_1$ to $38_3$. The inputs of the three RAMs in blocks $282_1$ to $282_{12}$ are connected to the output terminal 21A of receiving circuit 21 (FIG. 5) and to write wires $37_2$ and $37_3$ respectively. When terminal 21A is at state "1", following a normal withdrawal of the coin box, a 4-bit word representing a totalizer-counter account digit is written in a four-cell RAM memory, also included in memory block $282_1$ to $282_{12}$. Thus, six 4-bit RAM memories included in blocks $282_1$ to $282_{12}$ memorize the six binary code digits delivered by the coinage totalizer-counter 26TM via bus 28TM having $6 \times 4 = 24$ wires, and six 4-bit RAM memories in blocks $282_7$ to $282_{12}$ memorize the six binary code digits delivered by the charge unity totalizer-counter 26TTB via bus 28TTB having $6 \times 4 = 24$ wires.

The 4-bit RAMs in blocks $282_1$ to $282_{12}$ each deliver the corresponding binary code digit to processor 3 via an input read 4-wire bus 39, in response to the corresponding address on bus 36.

Control memory blocks 283 and 284 each also include a 1-bit ROM memory and a 5-bit ROM memory connected to wire 285 and to block address bus 36 respectively. In addition, each block 283 and 284 contains a 1-bit RAM memory having a write input connected to wire $37_3$ and an erase input connected to wire $37_2$. A read output of memory RAM 283 is connected to the monitor restoration terminal 28R, and a read output of memory RAM 284 is connected to the reset terminals 28RZ of totalizers-counters 26TM and 26TTB.

The 32 memory blocks $281_1$ to $281_{18}$, $282_1$ to $282_{12}$, 283 and 284 in the 1024 active equipments are cyclically explored by a $10+5=15$ stage counter included in a link processor 3. An active equipment is addressed by the 10 bits delivered on bus 35, which addresses the above-mentioned 32 memory blocks in this equipment, and each of these blocks is addressed in turn by bus 36. A time base of about 60 kHz included in processor 3 sets an exploration cycle of about 500 ms, and a memory block interrogation time of about 15 microseconds.

In each memory block $281_1$ to $281_{18}$ and $282_1$ to $282_{12}$, each of the three 1-bit RAMs memories the state of its input, either a "1" indicating an anomaly, a coin box withdrawal or a processor processing phase, or a "0" indicating an erasure of preceding information. The inputs of these three RAMs are data and write enable inputs. However, in each control memory block 283 and 284, wire $37_2$ is connected to an erase input of the 1-bit RAM in order to erase the "1" bit written via the data input of this 1-bit RAM connected to wire $37_3$. Whenever wire 285 is at "1", and an address is present on bus 36, the processor enables reading of information in the RAMs of the addressed memory block.

The following table I gives the signallings for processing of an anomaly stored in a block $281_1$ to $281_{18}$ by link processor 3, with reference to the states of wires $38_1$, $38_2$ and $38_3$.

TABLE I

| $38_1$ | $38_2$ | $38_3$ | Phase of link processor 3 |
|---|---|---|---|
| 0 | 0 | 0 | No anomaly to be transmitted |
| 1 | 0 | 0 | Anomaly to be transmitted |
| 1 | 1 | 0 | Anomaly undergoing processing |
| 1 | 1 | 1 | Anomaly transmitted and received by the management computer OG with acknowledgement |
| 0 | 1 | 1 | Cause of anomaly disappeared Call to computer OG by processor |
| 0 | 0 | 1 | Restoration of active equipment 2 corresponding to the end of the anomaly transmitted to computer OG and received by it |
| 0 | 0 | 0 | Return to rest No anomaly to be transmitted |

For the above signallings, the information transmitted by processor 3 to computer OG is in the form of a stream of 10 half-octets comprising:

the 3-binary-coded-digit-address-of the processor for example;

the 4-binary-coded-digit-address of the equipment, between 0001 and 1024;

the 2-binary-coded-digit-address of the anomaly memory block between 01 and 18; and a 4-bit "Service A" word for anomaly to be written and start of message; or a 4bit "Service B" word for restoration of active equipment and start of message; or a 4-bit "Service C" word for acknowledgment, in both directions of transmissions; or a 4-bit "Service D" word for please-repeat-message request in both directions of transmission; or a 4-bit "Service D" word for end-of-message, in both directions of transmission.

The computer translates the received signalling word and performs, according to the selected program, the processing planned for this signalling. It in particular makes the distinction between a signalling to be written (Code A) or a restoration and end-of-signalling (Code B).

The operation of blocks $282_1$ to $282_{12}$ is identical to that of blocks $281_1$ to $281_{18}$ with regard to the addressing and management of the processor call by a block. For each of these blocks $282_1$ to $282_{12}$ there is added the writing or reading of a half-octet in the RAM memory corresponding to a decimal digit to be transmitted. The call order to processor 3 is given for all these 12 blocks by a "1" at terminal 21A recorded in the first associated 1-bit RAMs. The procedure and the phases encountered in the event of an anomaly are given here. Only the content of each signalling message is supplemented by the 4 bits of the digit to be transmitted.

In addition, and for this type of signalling only, when the 12 digits have been transmitted and received by the computer OG under the control of processor 3, the processor marks the RAM of block 284 with a "1" via wire $37_3$. Output 28RZ of this RAM controls resetting of the coinage and charge unity totalizers-counters 26TM and 26TTB in the charging checking circuit 26 of the active equipment concerned (FIG. 8). The simultaneous resetting of these 12 digits, checked on return by processor 3 via bus 39, enables it to check that the totalizers-counters have in fact been reset. Once this check is done, processor 3, via wire $37_2$, erases the reset order entered in the RAM of block 284. The state of RAM 284 and output 28RZ returns to "0".

The following Table II gives the signalling for processing of a totalizer-counter digit by link processor 3, with reference to read output wires $38_1$, $38_2$ and $38_3$. The states of terminal 21A and write input wires $37_2$ and $37_3$, as well as the reset terminal 28RZ for totalizer counts 26TM and 26TTB are also given.

TABLE II

| $38_1$ | $38_2$ | $38_3$ | Phase of link processor 3 | 21A | $37_2$ | $37_3$ | 28RZ |
|---|---|---|---|---|---|---|---|
| 0 | 0 | 0 | No digit to be transmitted | 0 | 0 | 0 | 0 |
| 1 | 0 | 0 | Coin box withdrawal or incident. Digit to be transmitted | 1 | 0 | 0 | 0 |
| 1 | 1 | 0 | Digit undergoing processing. Link process undertaken by the processor | 1 or 0 | 0 | 0 | 0 |
| 1 | 1 | 1 | Transmitted digit received by the computer with acknowledgement | 1 or | 0 | 0 | 0 |
| 1 | 1 | 1 | Order to reset totalizer counters 26TM and 26TTB | 1 or 0 | 0 | 1 | 1 |
| 1 | 1 | 1 | Check by processor of resetting of 4-bit RAMs. If bus 39 at "0", marking of "1" on wire $37_2$; reset done and | 1 or 0 | 1 | 1 | 1 |

TABLE II-continued

| $38_1$ | $38_2$ | $38_3$ | Phase of link processor 3 | 21A | $37_2$ | $37_3$ | 28RZ |
|---|---|---|---|---|---|---|---|
| | | | checked; end of processing | | | | |
| 1 | 1 | 1 | 1st case: terminal 21A at "1" and coin box compartment open; stoppage processing under anomaly | 1 | 1 | 1 | 1 |
| 0 | 0 | 0 | 2nd case: terminal 21A at "0" and coin box compartment in normal operation, return to rest | 0 | 0 | 0 | 0 |

It will be noted that contrary to the case of anomaly signalling, digit signalling is marked in the first 1-bit RAMs of the respective block $282_1$ to $282_{12}$ by a short pulse via terminal 21A, the state "1" thus written only being erasable by processor 3 at the end of processing of this signalling.

In the case of an anomaly, the disappearance of the signalling has to be located and noted. In the case of a digit, the opening of the coin box compartment is to be noted and recorded, however short its duration, is in order to avoid fraud by manipulation of contacts 117 and 118 in the coin box compartment 110. Taking account the duration of the scanning cycle, the computer OG records this signalling if it has a duration of at least 500 ms. The coin box compartment opening and closing check as well as the out-of-service command decided by the computer OG depend on the signallings already seen, via terminals $28A_8$ and 28R.

The charging checking circuit 26 in the active equipment is inhibited during the processing of digit signallings by an output 28ICT of the first 1-bit RAM of one of blocks $282_1$ to $282_{12}$, such as block $282_{12}$, as shown in FIG. 9, connected to an input of the NOR gate 271 which closes or opens AND gates $215_1$ to $215_6$ (FIG. 5).

The purpose of this inhibition is to avoid disturbing the charging checking circuit 26 in the possible event in which the "digit" signalling processing terminates well after closure of compartment 110, following normal withdrawal of the coin box or breaking into the compartment. Indeed, a return to the service of the public telephone apparatus could be followed by resetting of the totalizers-counters thus entailing a loss of informations, since the transmission time for the data from processor 3 to the computer OG essentially depends on the time taken to establish a communication, generally about 10 to 40 seconds, whereas message transmission in the case of the 12 digits and thus 184 bits takes less than one second (transmission rate of 200 Bauds).

The rapidity of the processor 3 exploration cycle will make the addition of a buffer memory to the processor virtually pointless. Such a buffer memory is virtually constituted by the memory blocks in the active equipment storing circuits. The risk of losing data in the case of anomaly signallings is insignificant and would only mean that a very fleeting signalling would not be noted. With regard to digit signallings, the steps taken mean that the entire passive equipment/active equipment system and, in particular, the charging checking circuit 26, is blocked throughout processing of signalling relative to digits. The digit data cannot be modified or erased throughout this period and will be processed whatever its duration and even several days later in the event of a serious incident affecting the link 31 between processor 3 and management computer OG. As already mentioned, the processing of several signallings during a given cycle is guaranteed by means of the N-channel multiplexer 32 (FIG. 4).

In another embodiment, the majority of the active equipment 2 circuits, such as monitor 27 and the charging checking circuit, are in microprocessor form. Similarly, certain circuits in passive equipment 1, such as circuits 12 and 14 described previously in reference to discrete components, may also be in microprocessor form.

What I claim is:

1. Control and surveillance system for a prepayment public telephone apparatus connected to a telephone central office via a telephone line, comprising:

a first equipment included in said apparatus and connected to said telephone line for transmitting signalling signals indicating particularly an energization of said apparatus, a hook-off, an insertion of a prepaid credit token having indicia representing a prepaid credit into said apparatus, a collection of a part of a prepaid credit on said prepaid credit token and apparatus operating anomalies, and receiving collection order signals carried on said telephone line and ordering a collection of a part of a prepaid credit on said prepaid credit token, and a second equipment interconnected across said telephone line between said apparatus and said central office receiving and being responsive to said signalling signals and detecting signals transmitted from said central office to indicate (a) establishing, (b) breaking, and (c) interrupting phases of a telephone communication, as well as (d) transmitting said collection order signals on said telephone line, and (e) checking the operation of said apparatus and detecting signals, said telephone line having between said first and second equipments a frequency transmission band wider than a conventional voice telephone frequency transmission band-width to transmit, without disturbing said telephone communication, said signalling and collection order signals by transmitting carrier frequencies higher than telephone frequencies in said conventional band.

2. A system according to claim 1, wherein said second equipment comprises means for applying a dc voltage to said telephone line between said second and first equipments, and wherein said first equipment comprises means for power supplying said first equipment from said dc voltage.

3. A system according to claim 2, wherein said first equipment comprises means for transmitting a first signalling signal to said second equipment responsive to power supplying of said first equipment, and wherein said second equipment comprises means for receiving said first signalling signal and means for detecting transmission and reception faults in said first signalling signal via said transmitting and receiving means during a predetermined period, and means for controlling said dc voltage applying means for stopping said power supply to said first equipment following faults detected by said detecting means during said predetermined period.

4. A system according to claim 1, wherein said first equipment comprises means for transmitting a second signalling signal to said second equipment as soon as said prepaid credit token is inserted into collection means of said apparatus, said second equipment comprises means for looping said telephone line between said second equipment and said central office in response to said signalling signal, thereby simulating a hook-off with respect of said telephone apparatus.

5. A system according to claim 4, wherein said second equipment comprises means for briefly interrupting a power supply of the first equipment as soon as at least a part of said second signalling signal is transmitted continuously for a second predetermined period following insertion of said prepaid credit token in said collecting means.

6. A system according to claim 4, wherein said second equipment comprises means for definitively stopping the power supply of the first equipment when said second signal is partially transmitted by the first equipment or partially received by said second equipment for a second predetermined period following insertion of said prepaid credit token into said collecting means, and wherein a cessation in said power supply of said first equipment triggers refunding of inserted and not collected prepaid credit token.

7. A system according to claim 4, wherein said second equipment comprises counting means for definitively stopping a power supply of said first equipment when said second signalling signal is partially received by the second equipment for a second predetermined period and repeated after a predetermined number of successive prepaid credit token insertions into the collecting means, and wherein a cessation in said power supply of said first equipment triggers a refunding of inserted and not collected prepaid credit token.

8. A system according to claim 1, wherein said apparatus comprises means for delivering dialing pulses, and said first equipment comprises means for transmitting a third signalling signal modulated by said dialling pulses to said second equipment, and wherein said second equipment comprises means for demodulating said dialing pulses into demodulated dialing pulses and means for looping and unlooping said telephone line between said second equipment and said telephone central office in response to said demodulated dialing pulses.

9. A system according to claim 1, wherein said second equipment comprises means for briefly interrupting a power supply of said first equipment and triggering refunding of a prepaid credit on said prepaid credit token not collected from said apparatus, when said second equipment does not receive said response signal from a called party transmitted by said central office, after a predetermined period following insertion of said prepaid credit token into said apparatus.

10. A system according to claim 1, wherein said second equipment comprises means for detecting a response signal from a called party transmitted by said central office, such as a first battery reversal, and means for holding a line loop between said second equipment and said central office following said detected response signal.

11. A control and surveillance system for a prepayment public telephone apparatus connected to a telephone central office via a telephone line, comprising:
a first equipment included in said apparatus and connected to said telephone line for transmitting signalling signals indicating particularly an energization of said apparatus, a hook-off, an insertion of a prepaid credit token having indicia representing a prepaid credit into said apparatus, a collection of a part of a prepaid credit on said prepaid credit token and apparatus operating anomalies, and receiving collection order signals carried on said telephone line and ordering a collection of a part of a prepaid credit on said prepaid credit token, and
a second equipment interconnected across said telephone line between said apparatus and said central office receiving and being responsive to said signalling signals and detecting signals transmitted from said central office to indicate (a) establishing, (b) breaking, and (c) interrupting phases of a telephone communication, as well as (d) transmitting said collection order signals on said telephone line, and (e) checking the operation of said apparatus and detected signals,
said telephone line having between said first and second equipments a frequency transmission band wider than a conventional voice telephone frequency transmission band-width to transmit, without disturbing said telephone communication, said signalling and collection order signals by transmitting carrier frequencies higher than telephone frequencies in said conventional band, and
said second equipment comprising means for detecting charge pulses transmitted by said central office, and charging checking means for constantly evaluating a communication balance as a function of a number of charge pulses and said prepaid credit token inserted into said apparatus throughout a conversation phase of said communication and for breaking off said communication after said balance has been negative for a third predetermined period.

12. A system according to claim 11, wherein said first equipment comprises means for collecting said transmitting one of signalling signals representative of collected coin to said second equipment in response to one of said collection order signal transmitted by the second equipment, and wherein said charging checking means comprises first means for calculating a first communication debit by cumulating the value of a basic charge unity in response to each detected charge pulse, first means for calculating a first communication credit by adding the values of collected coins during the communication in response to said signalling signals representative of collected coins respectively, first means for establishing a first communication balance equal to the difference between the first credit and debit, and means for transmitting said collection order signal to said first equipment whenever said balance is negative.

13. A system according to claim 12, wherein said collecting means comprises means for detecting abnormal routing of each collected coin between a coin storage zone and a collected coin receptacle, and means for replacing said signalling signal representative of collected coins by an anomaly signal transmitted to said second equipment when an abnormal routing of said collected coin is being detected.

14. A system according to claim 11, wherein said first equipment comprises means for collecting said prepaid credit token in the form of cancellation of charge unities from a prepaid card, and means for transmitting a signalling signal representative of a cancelled charge unity to said second equipment in response to said collection order signal transmitted by said second equipment, and wherein said charging checking means comprises second means for calculating a second communication debit by adding one unity in response to each detected charge unity pulse, second means for calculating a second credit communication by adding a unit in response to each signalling signal representative of a cancelled charge unit, second means for constantly establishing a second balance of said communication equal to the difference between said second debit and credit, and means for transmitting said collection order signal whenever said second balance is negative.

15. A system according to claim 12, wherein said second equipment comprises means for briefly breaking a power supply of said first equipment upon expiry of a second predetermined period during which said collection order signal is transmitted without the second equipment receiving any one of said collected coin representative signalling signals.

16. A system according to claim 12, wherein said first equipment comprises means for signalling an absence of said prepaid credit token in said collecting means in said second equipment in response to each collection order signal, and wherein said second equipment comprises means for transmitting a called party tone to said first equipment during no longer than a third predetermined period and as long as a balance of said communication remains negative, and means for interrupting voice signals carried by said telephone line for at most at most a fourth predetermined period preceding the end of said first predetermined period when said balance remains negative.

17. A system according to claim 12, wherein said first equipment comprises means for collecting coins of various values in a removable receptacle in a closing compartment, means for detecting opening of the compartment and removal of said receptacle from the compartment, and means for transmitting a signalling signal indicating opening of said compartment and removal of said receptacle to said second equipment, and wherein said second equipment comprises means for detecting said opening and removal signalling signal thereby signalling opening of said compartment and removal of said receptacle.

18. A system according to claim 17, wherein said opening and removal detecting means breaks the power supply of said collecting means as soon as said opening and removal is detected, so as to prevent establishment of said receptacle.

19. A system according to claim 12, wherein said charging checking means comprises means for totalizing said first communication credits between two successive openings and removals, means for reading a totalized amount in said totalizing means in response to said opening and removal signalling signal, and means for transmitting said totalized amount to remote management means through a telephone network, as soon as said opening and removal signalling signal is detected in said second equipment.

20. A system according to claim 17, wherein said second equipment comprises means for placing said first equipment in out-of-service mode by cutting off a power supply of said first equipment when said opening and removal signalling signal is received by said second equipment for longer than a fifth predetermined period.

21. A system according to claim 17, wherein said charging checking means comprises means for totalizing said first communication credits between two successive openings and removals and means for comparing the total of the first totalized credits with a predetermined amount in order to signal that the receptacle is full with coins.

22. A control and surveillance system for a prepayment public telephone apparatus connected to a central office via a telephone line, comprising:
a first equipment included in said apparatus and connected to said telephone line for transmitting signalling signals indicating particularly an energization of said apparatus, a hook-off, an insertion of a prepaid credit token having indicia representing a prepaid credit into said apparatus, a collection of a part of a prepaid credit on said prepaid credit token and apparatus operating anomalies, and receiving collection order signals carried on said telephone line and ordering a collection of a part of a prepaid credit on said prepaid credit token, and
a second equipment interconnected across said telephone line between said apparatus and said central office receiving and being responsive to said signalling signals and detecting signals transmitted from said central office to indicate (a) establishing, (b) breaking, and (c) interrupting phases of a telephone communication, as well as (d) transmitting said collection order signals on said telephone line, and (e) checking the operation of said apparatus and detected signals,
said telephone line having between said first and second equipments a frequency transmission band wider than a conventional voice telephone frequency transmission band-width to transmit, without disturbing said telephone communication, said signalling and collection order signals by transmitting carrier frequencies higher than telephone frequencies in said conventional band, and
said second equipment comprising means for detecting a calling party ringing signal transmitted by said central office in order to establish an incoming communication and means for transmitting a ringing tone to the first equipment, broadcast by a loudspeaker in said apparatus, and to said central office to indicate a public telephone apparatus call to a caller party.

23. A system according to claim 22, wherein said ringing tone is transmitted for no longer than a fifth predetermined period.

24. A system according claim 23, wherein said first equipment comprises means for transmitting a second signalling signal to said second equipment when a prepaid credit token is inserted into collecting means of said apparatus before expiry of said first predetermined period, and wherein said second equipment comprises means for looping the telephone line on said central office in response to said second signalling signal thereby simulating user hook-off and stopping said ringing signal.

25. A system according to claim 24, wherein said second equipment comprises means for detecting charge pulses transmitted by said central office, and charging checking means for constantly evaluating a communication balance as a function of a number of charge pulses and said prepaid credit token inserted into said apparatus throughout a conversation phase of said communication and for breaking off said communication after said balance be negative for a second predetermined period, and means for inhibiting charging checking means in response to said second signal.

26. A system according to claim 24, wherein said second equipment comprises means for looping and unlooping the telephone line on said central office when said second signal is not detected during said first predetermined period.

27. A system according to claim 1, wherein said public telephone apparatus comprises a handset having an earpiece and a microphone, a fixed loudspeaker and a fixed microphone, and means, manually activated when the handset is grasped, for controlling switching means selectively connecting said earpiece and said microphone of said handset and said fixed loudspeaker and microphone to said telephone line.

28. A control and surveillance system for a prepayment public telephone apparatus connected to a telephone central office via a telephone line, comprising:
a first equipment included in said apparatus and connected to said telephone line for transmitting signalling signals indicating particularly an energization of said apparatus, a hook-off, an insertion of a prepaid credit token having indicia representing a prepaid credit into said apparatus, a collection of a part of a prepaid credit on said prepaid credit token and apparatus operating anomalies, and receiving collection order signls carried on said telephone line and ordering a collection of a part of a prepaid credit on said prepaid credit token, and
a second equipment interconnected across said telephone line between said apparatus and said central office receiving and being responsive to said signalling signals and detecting signals transmitted from said central office to indicate (a) establishing, (b) breaking, and (c) interrupting phases of a telephone communication, as well as (d) transmitting said collection order signals on said telephone line, and (e) checking the operation of said apparatus and detected signals,
said telephone line having between said first and second equipments a frequency transmission band wider than a conventional voice telephone frequency transmission band-width to transmit, without disturbing said telephone communication, said signalling and collection order signals by transmitting carrier frequencies higher than telephone frequencies in said conventional band, and
said second equipment comprising means for transmitting predetermined signals to remote management means via a telephone network, said predetermined signals operating anomalies in said first equipment and an excessive communication cost, respectively.

29. A system according to claim 28, wherein said operating anomaly consists of:
a transmission fault in said first equipment and reception fault in said second equipment concerning a first signalling signal transmitted almost permanently by said first equipment,
abnormal attenuation and breakage of the telephone line between said equipments,
a transmission fault in said first equipment or reception fault in said second equipment and reception fault in said second equipment concerning at least a part of a second signalling signal transmitted by said first equipment following a hook-off phase simulated by insertion of a prepaid credit token having indicia representing a prepaid credit into collecting means of said apparatus in said first equipment,
a predetermined number of consecutive fruitless call attempts, without exchange of voice signals from said first equipment, each of the attempts exceeding a first predetermined period,
a collection fault concerning part of a prepaid credit on said prepaid credit token inserted into said first equipment following transmission of a collection order signal by said second equipment to said first equipment for at least a second predetermined period,
opening of a compartment containing a coin receptacle in said apparatus, and
withdrawal of said receptacle from said compartment during at least a third predetermined period.

30. A system according to claim 28, wherein said excessive communication cost consists of
a cost of a communication prepaid by coins collected in said first equipment and exceeding a predetermined maximum communication cost,
a cost of a communication prepaid by means of a prepaid card inserted into said first equipment and exceeding a predetermined maximum credit value available with a credit card, and
an amount of coins collected in said receptacle in said first equipment exceeding a predetermined maximum amount of coins which said receptacle is capable of containing.

31. A system according to claim 14, wherein said second equipment comprises means for briefly breaking a power supply of said first equipment upon expiry of a second predetermined period during which said collection order signal is transmitted without said second equipment receiving said signalling signal representative of a cancelled charge unity.

32. A system according to claim 14, wherein said first equipment comprises means for signalling an absence of said prepaid credit token in said collecting means in said second equipment in response to each collection order signal, and wherein said second equipment comprises means for transmitting a called party tone to said first equipment during no longer than a third predetermined period and as long as a balance of said communications remains negative, and means for interrupting voice signals carried by said telephone line for at most a fourth predetermined period preceding the end of said first predetermined period when said balance remains negative.

* * * * *